US008135603B1

(12) United States Patent
Gordon

(10) Patent No.: US 8,135,603 B1
(45) Date of Patent: Mar. 13, 2012

(54) METHOD FOR FORMULATING A PLAN TO SECURE ACCESS TO LIMITED DELIVERABLE RESOURCES

(76) Inventor: Robert D. Gordon, Walla Walla, WA (US)

( * ) Notice: Subject to any disclaimer, the term of this patent is extended or adjusted under 35 U.S.C. 154(b) by 1028 days.

(21) Appl. No.: 12/077,901

(22) Filed: Mar. 20, 2008

Related U.S. Application Data

(60) Provisional application No. 60/919,202, filed on Mar. 20, 2007.

(51) Int. Cl.
G06Q 10/00 (2006.01)
(52) U.S. Cl. ...................... 705/7.12; 705/7.36
(58) Field of Classification Search ............ 705/7.12
See application file for complete search history.

(56) References Cited

U.S. PATENT DOCUMENTS

| | | | |
|---|---|---|---|
| 5,115,504 A | 5/1992 | Belove et al. | |
| 5,406,476 A * | 4/1995 | Deziel et al. | 705/7.15 |
| 5,818,737 A | 10/1998 | Orr et al. | |
| 5,845,258 A | 12/1998 | Kennedy | |
| 5,953,707 A * | 9/1999 | Huang et al. | 705/7.25 |
| 6,115,691 A * | 9/2000 | Ulwick | 705/7.32 |
| 6,377,551 B1 | 4/2002 | Luo et al. | |
| 6,393,473 B1 | 5/2002 | Chu | |
| 6,408,262 B1 | 6/2002 | Leerberg et al. | |
| 6,536,935 B2 | 3/2003 | Parunak et al. | |
| 6,581,027 B1 | 6/2003 | Sheer et al. | |
| 6,658,422 B1 | 12/2003 | Levanoni et al. | |
| 7,003,578 B2 | 2/2006 | Kanada et al. | |
| 7,062,406 B2 | 6/2006 | Patwardhan et al. | |
| 7,103,479 B2 * | 9/2006 | Patwardhan et al. | 702/2 |
| 7,124,101 B1 * | 10/2006 | Mikurak | 705/35 |
| 7,136,617 B2 | 11/2006 | Libby | |
| 7,155,423 B1 | 12/2006 | Josephson et al. | |
| 7,172,118 B2 | 2/2007 | Urken | |
| 7,177,769 B2 | 2/2007 | Larsson et al. | |
| 7,187,652 B2 | 3/2007 | Lee et al. | |
| 7,197,469 B2 | 3/2007 | Hegde et al. | |
| 7,237,020 B1 | 6/2007 | Drew | |
| 7,302,482 B2 | 11/2007 | Rodosek et al. | |
| 7,308,494 B1 | 12/2007 | Drew et al. | |

(Continued)

OTHER PUBLICATIONS

Naso et al., "Genetic algorithm for suply-chain scheduling: a case study in the distribution of ready-mixed concrete", European Journal of Operational research 177 (2007) 2069-2099, available online Jan. 26, 2006 on Sciencedirect.com.*

Altiparmak et al., "A genetic algorithm approach for multi-objective optimization of supply chain networks". computers & industrial engineering, Elsevier, 51 (2006) 196-215.*

(Continued)

*Primary Examiner* — Jonathan G Sterrett
*Assistant Examiner* — Tzu-Hsiang Lan
(74) *Attorney, Agent, or Firm* — Pro Se

(57) ABSTRACT

The method of applying constraints across a generally extensible and configurable resource delivery system as a basis for identifying or calculating the relative impacts of each constraint on resource delivery to various points and, through the use of constraint release mechanisms, developing prescriptive courses of action to optimize and increase the certainty of delivery of the resource, or in the reverse sense, restrict delivery of the resource. In an embodiment of the present invention, a method for characterizing the availability and potential use of water resources alongside associated impacts in order to identify and time the various policy decisions and investments needed to ensure access to water supplies over time given multiple stakeholders and uncertain, variable supplies and demands where such embodiment provides additional methods generally applicable across the full scope of embodiments of the invention.

15 Claims, 41 Drawing Sheets

U.S. PATENT DOCUMENTS

| | | | |
|---|---|---|---|
| 7,333,960 | B2 | 2/2008 | Bonabeau et al. |
| 7,333,968 | B2 * | 2/2008 | Geller et al. .................... 706/46 |
| 7,337,153 | B2 * | 2/2008 | Peljto et al. .................... 705/412 |
| 7,685,015 | B2 * | 3/2010 | Najmi et al. ................. 705/7.25 |
| 7,805,380 | B1 * | 9/2010 | Hornbeck et al. ............. 705/315 |
| 2002/0156663 | A1 * | 10/2002 | Weber et al. ...................... 705/7 |
| 2003/0105673 | A1 * | 6/2003 | Dunbaugh et al. .............. 705/26 |
| 2003/0229526 | A1 * | 12/2003 | Gallacci et al. ................... 705/7 |
| 2005/0010922 | A1 * | 1/2005 | Czajkowski et al. ......... 718/102 |
| 2005/0108084 | A1 * | 5/2005 | Ramamoorti et al. .......... 705/10 |
| 2005/0209732 | A1 * | 9/2005 | Audimoolam et al. ....... 700/216 |
| 2006/0282346 | A1 * | 12/2006 | Kernodle et al. ................ 705/28 |
| 2007/0130093 | A1 * | 6/2007 | Haji-Valizadeh ............. 705/413 |
| 2007/0150325 | A1 * | 6/2007 | Bjornson .......................... 705/7 |
| 2008/0033785 | A1 * | 2/2008 | Anke ............................... 705/10 |
| 2008/0147490 | A1 * | 6/2008 | Najmi et al. .................... 705/10 |

OTHER PUBLICATIONS

Chan et al., "A hybrid genetic algorithm for production and distribution", Omega the international journal of management science, 33 (2005) 345-355.*

Abrishamachi et al., "Case study: application of multicritera decision making to Urban water supply", Journal of water resrouce planning and managmenet Jul. 8, 2005.*

Harland et al., "Resource-distribution via Boolean constraints".ACM Transactions on computer logic, vol. 4 issue Jan. 1, 2003.*

Gupta et al., "Genetic algorithm for optimization of water distribution system", Environmental Modeling&Software, 14 (1999) 437-446.*

Robert Gordon, Staecis Integrated Water Resource Model 1.1 (Documentation), Oct. 15, 2004, unpublished, Walla Walla, USA.

* cited by examiner

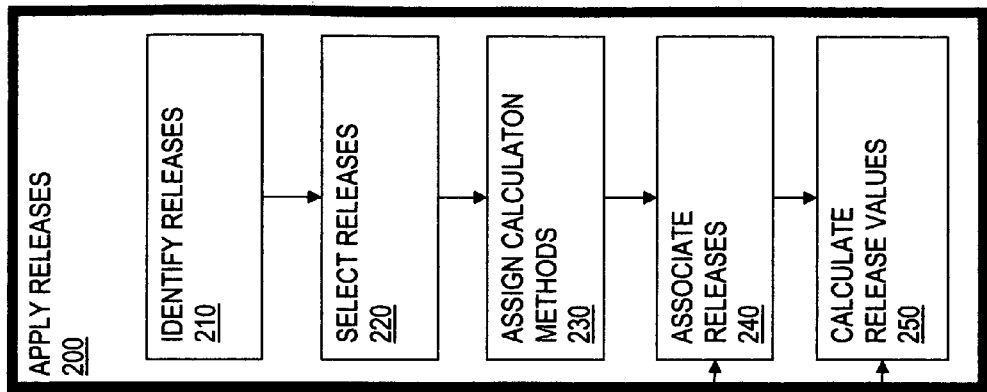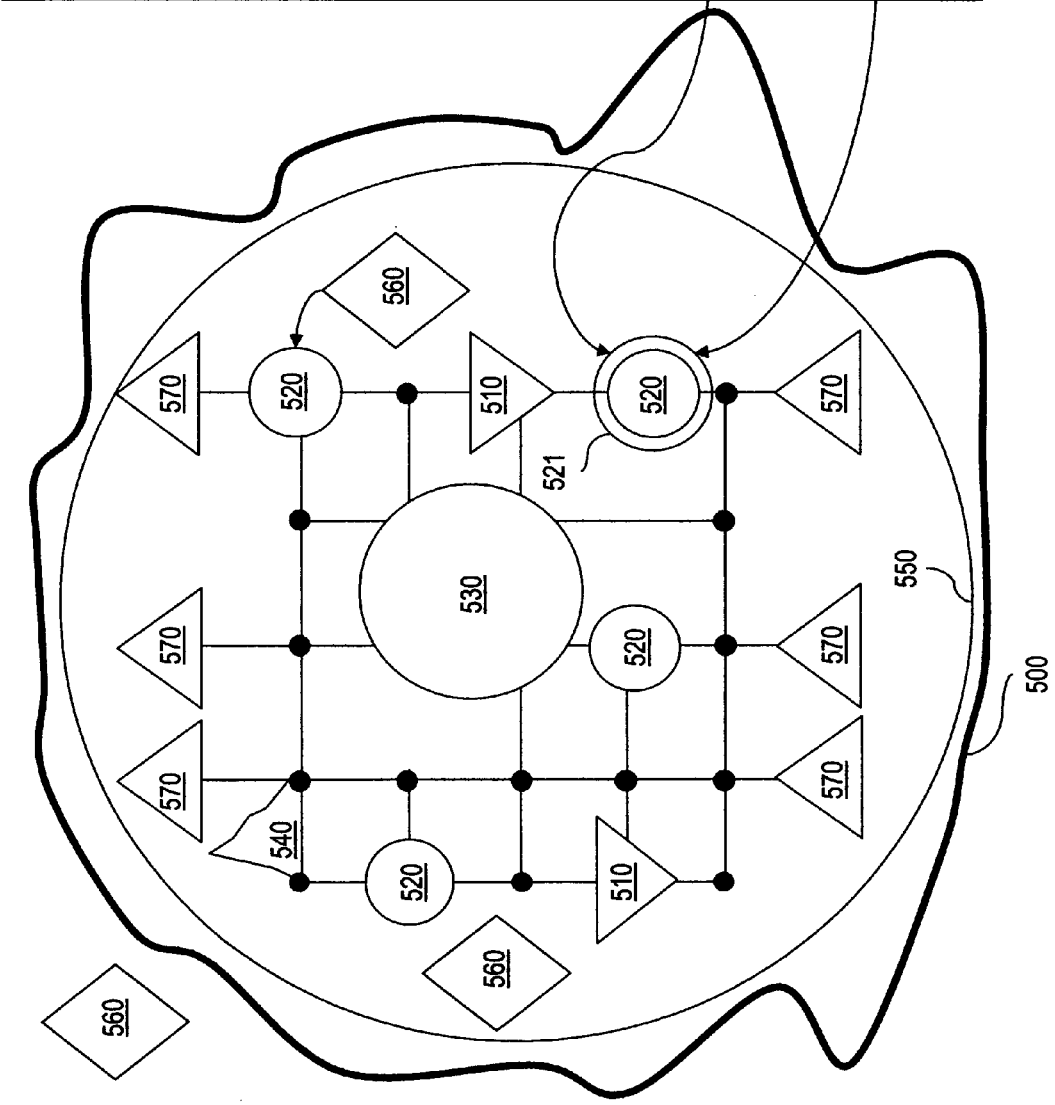
FIG. 8

| NO. | CONSTRAINT TYPE | RELEASE METHOD | START/END | PROBABILITY | RELEASE VALUES ||
| --- | --- | --- | --- | --- | --- | --- |
| | | | | | RELEASE VALUE | COST |
| 1 | SUPPLY | RELEASE 1 | 8/15 - 2/15 | 92% | 80 | 1000.00 |
| 1 | SUPPLY | RELEASE 2 | 6/31 - 12/31 | 98% | 120 | 600.80 |
| 1 | SUPPLY | RELEASE 3 | 1/1 - 6/30 | 93% | 60 | 577.90 |
| 2 | LEGAL | RELEASE 4 | 2/15 - 8/15 | 98% | 30 | 573.20 |
| 3 | COLLABORATIVE | RELEASE 5 | 11/1 - 5/1 | 90% | 68 | 184.40 |
| 3 | COLLABORATIVE | RELEASE 6 | 6/15 - 9/15 | 60% | 45 | 168.80 |
| 4 | SELF-IMPOSED | RELEASE 7 | 1/1 - 12/31 | 96% | 200 | 139.40 |
| 5 | SOCIAL | RELEASE 8 | 3/1 — 9/1 | 99% | 35 | 137.60 |
| 5 | SOCIAL | RELEASE 9 | 1/1— 12/31 | 32% | 80 | 100.10 |
| 5 | SOCIAL | RELEASE 10 | 7/15 - 2/28 | 91% | 42 | 84.10 |
| 6 | LEGAL | RELEASE 11 | 8/1 - 9/15 | 82% | 91 | 80.80 |
| 7 | OPERATIONAL | RELEASE 12 | 4/1 - 10/31 | 98% | 67 | 75.40 |
| 8 | ENVIRONMENTAL | RELEASE 13 | 9/1 - 8/15 | 72% | 35 | 50.00 |
| 9 | DEMAND | RELEASE 14 | 6/15 - 2/15 | 83% | 65 | 47.00 |
| 9 | DEMAND | RELEASE 15 | 9/1 - 3/1 | 95% | 107 | 40.00 |
| 9 | DEMAND | RELEASE 16 | 2/15 - 10/15 | 92% | 220 | 420.10 |
| 10 | DEMAND | RELEASE 14 | 1/15 - 11/30 | 65% | 83 | 60.30 |
| 10 | DEMAND | RELEASE 15 | 5/1 - 6/1 | 92% | 62 | 81.00 |

FIG. 9

| NO. | CONSTRAINT TYPE | RELEASE | START-END | PROBABILTY | RELEASE AMOUNT | COST | SORT PARAMETER |
|---|---|---|---|---|---|---|---|
| 1 | SUPPLY | RELEASE 1 | 8/15 - 2/15 | 92% | 80 | 1000.0 | 0.08 |
| 1 | SUPPLY | RELEASE 2 | 6/31 - 12/31 | 98% | 120 | 600.8 | 0.20 |
| 1 | SUPPLY | RELEASE 3 | 1/1 - 6/30 | 93% | 60 | 577.9 | 0.10 |
| 2 | LEGAL | RELEASE 4 | 2/15 - 8/15 | 98% | 30 | 573.2 | 0.05 |
| 3 | COLLABORATIVE | RELEASE 5 | 11/1 - 5/1 | 90% | 68 | 184.4 | 0.37 |
| 3 | COLLABORATIVE | RELEASE 6 | 6/15 - 9/15 | 60% | 45 | 168.8 | 0.27 |
| 4 | SELF-IMPOSED | RELEASE 7 | 1/1 - 12/31 | 96% | 200 | 139.4 | 1.43 |
| 5 | SOCIAL | RELEASE 8 | 3/1 — 9/1 | 99% | 35 | 137.6 | 0.25 |
| 5 | SOCIAL | RELEASE 9 | 1/1 - 12/31 | 32% | 80 | 100.1 | 0.80 |
| 5 | SOCIAL | RELEASE 10 | 7/15 - 2/28 | 91% | 42 | 84.1 | 0.50 |
| 6 | LEGAL | RELEASE 11 | 8/1 - 9/15 | 82% | 91 | 80.8 | 1.13 |
| 7 | OPERATIONAL | RELEASE 12 | 4/1 - 10/31 | 98% | 67 | 75.4 | 0.89 |
| 8 | ENVIRONMENT | RELEASE 13 | 9/1 - 8/15 | 72% | 35 | 50.0 | 0.70 |
| 9 | DEMAND | RELEASE 14 | 6/15 - 2/15 | 83% | 65 | 47.0 | 1.38 |
| 9 | DEMAND | RELEASE 15 | 9/1 - 3/1 | 95% | 107 | 40.0 | 2.67 |
| 9 | DEMAND | RELEASE 16 | 2/15 - 10/15 | 92% | 220 | 420.1 | 0.52 |
| 10 | DEMAND | RELEASE 14 | 1/15 - 11/30 | 65% | 83 | 60.3 | 1.38 |
| 10 | DEMAND | RELEASE 15 | 5/1 - 6/1 | 92% | 62 | 81.0 | 0.77 |

Columns START-END through RELEASE AMOUNT grouped as RELEASE VALUES. Reference 940.

FIG. 11

| NO. | CONSTRAINT TYPE | RELEASE METHOD | START-END | PROB. | RLS. AMT. | COST | SORT PARAMETER |
|---|---|---|---|---|---|---|---|
| 9 | DEMAND | RELEASE 15 | 9/1 - 3/1 | 95% | 107 | 40.0 | 2.67 |
| 4 | SELF-IMPOSED | RELEASE 7 | 1/1 - 12/31 | 96% | 200 | 139.4 | 1.43 |
| 9 | DEMAND | RELEASE 14 | 6/15 - 2/15 | 83% | 65 | 47.0 | 1.38 |
| 10 | DEMAND | RELEASE 14 | 1/15 - 11/30 | 65% | 83 | 60.3 | 1.38 |
| 6 | LEGAL | RELEASE 11 | 8/1 - 9/15 | 82% | 91 | 80.8 | 1.13 |
| 7 | OPERATIONAL | RELEASE 12 | 4/1 - 10/31 | 98% | 67 | 75.4 | 0.89 |
| 5 | SOCIAL | RELEASE 9 | 1/1 — 12/31 | 32% | 80 | 100.1 | 0.80 |
| 10 | DEMAND | RELEASE 15 | 5/1 - 6/1 | 92% | 62 | 81.0 | 0.77 |
| 8 | ENVIRONMENT | RELEASE 13 | 9/1 - 8/15 | 72% | 35 | 50.0 | 0.70 |
| 9 | DEMAND | RELEASE 16 | 2/15 - 10/15 | 92% | 220 | 420.1 | 0.52 |
| 5 | SOCIAL | RELEASE 10 | 7/15 - 2/28 | 91% | 42 | 84.1 | 0.50 |
| 3 | COLLABORATIVE | RELEASE 5 | 11/1 - 5/1 | 90% | 68 | 184.4 | 0.37 |
| 3 | COLLABORATIVE | RELEASE 6 | 6/15 - 9/15 | 60% | 45 | 168.8 | 0.27 |
| 5 | SOCIAL | RELEASE 8 | 3/1 — 9/1 | 99% | 35 | 137.6 | 0.25 |
| 1 | SUPPLY | RELEASE 2 | 6/31 - 12/31 | 98% | 120 | 600.8 | 0.20 |
| 1 | SUPPLY | RELEASE 3 | 1/1 - 6/30 | 93% | 60 | 577.9 | 0.10 |
| 2 | LEGAL | RELEASE 4 | 2/15 - 8/15 | 98% | 30 | 573.2 | 0.05 |
| 1 | SUPPLY | RELEASE 1 | 8/15 - 2/15 | 92% | 80 | 1000.0 | 0.08 |

FIG. 13

| CONSTRAINT NO. | CONSTRAINT TYPE | RELEASE METHOD | START-END | PROBABILITY | RELEASE AMOUNT | RELEASE COST | SORT PARAMETER | SUPPLY | DEMAND | NET |
|---|---|---|---|---|---|---|---|---|---|---|
| | | | | | | | | 570 | 1000 | -430 |
| 9 | DEMAND | RELEASE 15 | 9/1 - 3/1 | 95% | 107 | 40.0 | 2.67 | 570 | 893 | -323 |
| 4 | SELF-IMPOSED | RELEASE 7 | 1/1 - 12/31 | 96% | 200 | 139.4 | 1.43 | 770 | 893 | -123 |
| 9 | DEMAND | RELEASE 14 | 6/15 - 2/15 | 83% | 65 | 47.0 | 1.38 | 770 | 828 | -58 |
| 10 | DEMAND | RELEASE 14 | 1/15 - 11/30 | 65% | 83 | 60.3 | 1.38 | 770 | 745 | 25 |
| 6 | LEGAL | RELEASE 11 | 8/1 - 9/15 | 82% | 91 | 80.8 | 1.13 | | | |
| 7 | OPERATIONAL | RELEASE 12 | 4/1 - 10/31 | 98% | 67 | 75.4 | 0.89 | | | |
| 5 | SOCIAL | RELEASE 9 | 1/1 — 12/31 | 32% | 80 | 100.1 | 0.80 | | | |
| 10 | DEMAND | RELEASE 15 | 5/1 - 6/1 | 92% | 62 | 81.0 | 0.77 | | | |
| 8 | ENVIRONMENT | RELEASE 13 | 9/1 - 8/15 | 72% | 35 | 50.0 | 0.70 | | | |
| 9 | DEMAND | RELEASE 16 | 2/15 - 10/15 | 92% | 220 | 420.1 | 0.52 | | | |
| 5 | SOCIAL | RELEASE 10 | 7/15 - 2/28 | 91% | 42 | 84.1 | 0.50 | | | |
| 3 | COLLABORATIVE | RELEASE 5 | 11/1 - 5/1 | 90% | 68 | 184.4 | 0.37 | | | |
| 3 | COLLABORATIVE | RELEASE 6 | 6/15 - 9/15 | 60% | 45 | 168.8 | 0.27 | | | |
| 5 | SOCIAL | RELEASE 8 | 3/1 — 9/1 | 99% | 35 | 137.6 | 0.25 | | | |
| 1 | SUPPLY | RELEASE 2 | 6/31 - 12/31 | 98% | 120 | 600.8 | 0.20 | | | |
| 1 | SUPPLY | RELEASE 3 | 1/1 - 6/30 | 93% | 60 | 577.9 | 0.10 | | | |
| 2 | LEGAL | RELEASE 4 | 2/15 - 8/15 | 98% | 30 | 573.2 | 0.05 | | | |
| 1 | SUPPLY | RELEASE 1 | 8/15 - 2/15 | 92% | 80 | 1000.0 | 0.08 | | | |

| CONSTRAINT NO. | CONSTRAINT TYPE | RELEASE METHOD | START-END | PROBABILITY | RELEASE AMOUNT | RELEASE COST | SORT PARAMETER | SUPPLY | DEMAND | NET |
|---|---|---|---|---|---|---|---|---|---|---|
| 9 | DEMAND | RELEASE 15 | 9/1 - 3/1 | 95% | 107 | 40.0 | 2.67 | 570 | 1000 | -430 |
| 4 | SELF-IMPOSED | RELEASE 7 | 1/1 - 12/31 | 96% | 200 | 139.4 | 1.43 | 770 | 1000 | -230 |
| 9 | DEMAND | RELEASE 14 | 6/15 - 2/15 | 83% | 65 | 47.0 | 1.38 | | | |
| 10 | DEMAND | RELEASE 14 | 1/15 - 11/30 | 65% | 83 | 60.3 | 1.38 | | | |
| 6 | LEGAL | RELEASE 11 | 8/1 - 9/15 | 82% | 91 | 80.8 | 1.13 | | | |
| 7 | OPERATIONAL | RELEASE 12 | 4/1 - 10/31 | 98% | 67 | 75.4 | 0.89 | 837 | 1000 | -163 |
| 5 | SOCIAL | RELEASE 9 | 1/1 — 12/31 | 32% | 80 | 100.1 | 0.80 | | | |
| 10 | DEMAND | RELEASE 15 | 5/1 - 6/1 | 92% | 62 | 81.0 | 0.77 | | | |
| 8 | ENVIRONMENT. | RELEASE 13 | 9/1 - 8/15 | 72% | 35 | 50.0 | 0.70 | | | |
| 9 | DEMAND | RELEASE 16 | 2/15 - 10/15 | 92% | 220 | 420.1 | 0.52 | 837 | 780 | 57 |
| 5 | SOCIAL | RELEASE 10 | 7/15 - 2/28 | 91% | 42 | 84.1 | 0.50 | | | |
| 3 | COLLABORATIVE | RELEASE 5 | 11/1 - 5/1 | 90% | 68 | 184.4 | 0.37 | | | |
| 3 | COLLABORATIVE | RELEASE 6 | 6/15 - 9/15 | 60% | 45 | 168.8 | 0.27 | | | |
| 5 | SOCIAL | RELEASE 8 | 3/1 — 9/1 | 99% | 35 | 137.6 | 0.25 | | | |
| 1 | SUPPLY | RELEASE 2 | 6/31 - 12/31 | 98% | 120 | 600.8 | 0.20 | | | |
| 1 | SUPPLY | RELEASE 3 | 1/1 - 6/30 | 93% | 60 | 577.9 | 0.10 | | | |
| 2 | LEGAL | RELEASE 4 | 2/15 - 8/15 | 98% | 30 | 573.2 | 0.05 | | | |
| 1 | SUPPLY | RELEASE 1 | 8/15 - 2/15 | 92% | 80 | 1000.0 | 0.08 | | | |

970

CONSTRAINTS ON INDIVIDUAL RELEASES: START = 7/1; END = 7/1; PROBABILITY >= 85%;
CONSTRAINTS ON ALL RELEASES (SOLUTION): TOTAL RELEASE COST < 680

| NO. | CONSTRAINT TYPE | RELEASE | START-END | RELEASE PROBABILITY | RELEASE AMOUNT | COST | SORT PARAMETER | SUPPLY | DEMAND | NET |
|---|---|---|---|---|---|---|---|---|---|---|
| STEP 1—7/31 | | | | | | | | | | |
| 4 | SELF-IMPOSED | RELEASE 7 | 1/1 - 12/31 | 96% | 200 | 139.4 | 1.43 | 570 | 1000 | -430 |
| 7 | OPERATIONAL | RELEASE 12 | 4/1 - 10/31 | 98% | 67 | 75.4 | 0.89 | 770 | 1000 | -230 |
| 9 | DEMAND | RELEASE 16 | 2/15 - 10/15 | 92% | 220 | 420.1 | 0.52 | 837 | 1000 | -163 |
| | | | | | | | | 837 | 780 | 57 |
| STEP 2—8/1 | | | | | | | | | | |
| 4 | SELF-IMPOSED | RELEASE 7 | 1/1 - 12/31 | 93% | 175 | 120 | 1.46 | 575 | 1100 | -475 |
| 6 | LEGAL | RELEASE 11 | 8/1 - 9/15 | 82% | 90 | 80.8 | 1.11 | 750 | 1100 | -350 |
| 7 | OPERATIONAL | RELEASE 12 | 4/1 - 10/31 | 89% | 75 | 80 | .94 | 840 | 1100 | -260 |
| 9 | DEMAND | RELEASE 14 | 2/15 - 10/15 | 95% | 225 | 390 | .58 | 915 | 1100 | -185 |
| | | | | | | | | 1140 | 875 | 40 |

RELEASE VALUES ⟩ 980

CONSTRAINTS ON INDIVIDUAL RELEASES: STEP >= START AND STEP<= END; PROBABILITY >= 85%;
CONSTRAINTS ON ALL RELEASES (SOLUTION): TOTAL RELEASE COST < 680

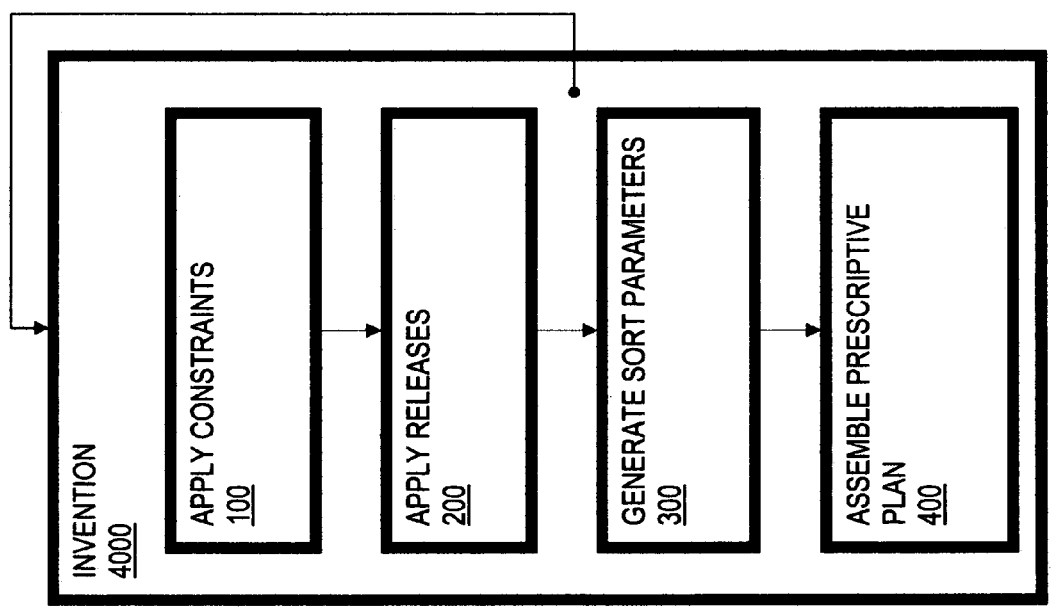

FIG. 21

RELEASE VALUES

| CONSTRAINT NO. | CONSTRAINT TYPE | RELEASE | START-END | PROBABILITY | RELEASE AMOUNT | RELEASE COST | SORT PARAMETER | SUPPLY | DEMAND | NET |
|---|---|---|---|---|---|---|---|---|---|---|
| STEP 1 — 7/31 | | | | | | | | 570 | 1000 | -430 |
| 4 | SELF-IMPOSED | RELEASE 7 | 1/1 - 12/31 | 96% | 200 | 139.4 | 1.43 | 770 | 1000 | -230 |
| 7 | OPERATIONAL | RELEASE 12 | 4/1 - 10/31 | 98% | 67 | 75.4 | 0.89 | 837 | 1000 | -163 |
| 9 | DEMAND | RELEASE 16 | 2/15 - 10/15 | 92% | 220 | 420.1 | 0.52 | 837 | 780 | 57 |
| STEP 2 — 8/1 | | | | | | | | 575 | 1100 | -475 |
| 4 | SELF-IMPOSED | RELEASE 7 | 1/1 - 12/31 | 93% | 175 | 120 | 1.46 | 750 | 1100 | -350 |
| 6 | LEGAL | RELEASE 11 | 8/1 - 9/15 | 82% | 90 | 80.8 | 1.11 | 840 | 1100 | -260 |
| | RELEASE ON CONSTRAINT OF RELEASE 11 OF CONSTRAINT NO. 6 | | | | | | | | | |
| | WAIVER | PERMIT A17 | 8/1 - 12/31 | 90% | | -10 | | | | |
| 7 | OPERATIONAL | RELEASE 12 | 4/1 - 10/31 | 89% | 75 | 80 | .94 | 915 | 1100 | -185 |
| 9 | DEMAND | RELEASE 14 | 2/15 - 10/15 | 95% | 225 | 390 | .58 | 915 | 875 | 40 |

— 990

CONSTRAINTS ON INDIVIDUAL RELEASES: STEP >= START AND STEP<= END; PROBABILITY >= 85%;
CONSTRAINTS ON ALL RELEASES (SOLUTION): TOTAL RELEASE COST < 665

| CONSTRAINTS | SUPPLIES | | ... | CONSTRAINTS | | | | ... | DEMANDS | |
| --- | --- | --- | --- | --- | --- | --- | --- | --- | --- | --- |
| | 1 (SUPPLY) | | | 6 (LEGAL) | | 7 (OPERATIONAL) | | | 9 (DEMAND) | |
| | IMPACT QUANTITY | INCIDENCE (DAYS) | | IMPACT QUANTITY | INCIDENCE (DAYS) | IMPACT QUANTITY | INCIDENCE (DAYS) | | IMPACT QUANTITY | INCIDENCE (DAYS) |
| JANUARY | 26300 | 24 | | 2821 | 30 | 944 | 8 | | 8375 | 30 |
| FEBRUARY | 26400 | 22 | | 2548 | 30 | 1140 | 10 | | 8600 | 30 |
| MARCH | 25200 | 28 | | 2821 | 30 | 1890 | 15 | | 8950 | 30 |
| DECEMBER | 834 | 27 | | 0 | 0 | 0 | 7 | | | |
| ANNUAL | 288000 | 240 | | 16380 | 180 | 12480 | 156 | | 105850 | 365 |
| AVERAGE | 24000 | 20 | | 1365 | 15 | 1040 | 13 | | 8820 | 30 |
| RELEASES | | | | | | | | | | |
| RELEASE 7 | 0 | 0 | | 0 | 0 | 0 | 0 | | 0 | 0 |
| RELEASE 11 | 0 | 0 | | 16380 | 180 | 0 | 0 | | 0 | 0 |
| RELEASE 12 | 0 | 0 | | 0 | 0 | 8610 | 143 | | 0 | 0 |
| RELEASE 14 | 0 | 0 | | 0 | 0 | 0 | 0 | | 35500 | 203 |
| RELEASE 16 | 0 | 0 | | 0 | 0 | 0 | 0 | | 28400 | 162 |
| ANNUAL | 288000 | 240 | | 16380 | 180 | 8610 | 143 | | 63900 | 365 |
| NET | 0 | N/A | | 0 | N/A | 3870 | N/A | | 41950 | |

FIG. 23

| CONSTRAINT CATEGORY | SUPPLY | CONSTRAINT | CONSTRAINED SUPPLY | | |
|---|---|---|---|---|---|
| | | | JANUARY | FEBRUARY | MARCH ... |
| SUPPLY | | | 40300 | 53300 | 60300 |
| | RIVER | | 24000 | 28000 | 31000 |
| | | AGRICULTURE | 1000 | 1000 | 3000 |
| | | LOSING REACH | 2200 | 2200 | 2200 |
| | | EFFECTIVE: | 20800 | 24800 | 25800 |
| | WATERSHED | | 34500 | 43500 | 48000 |
| | | PRIOR RIGHTS | 10000 | 10000 | 8500 |
| | | RESERVED RIGHTS | 5000 | 5000 | 5000 |
| | | EFFECTIVE: | 19500 | 28500 | 34500 |
| WATER QUALTIY | | | 25300 | 38300 | 45300 |
| | RESIDUAL | | 40300 | 53300 | 60300 |
| | | CHEMICAL 1 | 7000 | 8000 | 9000 |
| | | TURBIDITY | 8000 | 7000 | 6000 |
| | | EFFECTIVE: | 25300 | 38300 | 45300 |
| DEMANDS | | | -1800 | -1320 | 6000 |
| | RESIDUAL | | 25300 | 38300 | 45300 |
| | | RESIDENTIAL | 20100 | 22000 | 32000 |
| | | INDUSTRIAL | 7000 | 7200 | 7300 |
| | | EFFECTIVE: | -1800 | -1320 | 6000 |

| CONSTRAINT CATEGORY | CONSTRAINT | IMPACT | RELEASE | ANNUAL QUANTITY | COST | COST/ QUANTITY |
|---|---|---|---|---|---|---|
| SUPPLY | | | | | | |
| | RIVER | 63600 | WATER BANK | 20000 | 1400000 | 70 |
| | | | RIGHT PURCHASE | 3500 | 7000000 | 2000 |
| | | | RESERVE SHARE | 5000 | 28000 | 6 |
| | WATERSHED | 132000 | PRIOR RIGHTS | 10000 | 10000 | 1 |
| | | | RESERVED RIGHTS | 5000 | 10000 | 2 |
| WATER QUALITY | | | | | | |
| | CHEMICAL 1 | 23000 | PRE-MIX TREATMENT | 12000 | 1250000 | 104 |
| | TURBIDITY | 45000 | SETTLING | 14000 | 430000 | 31 |
| DEMANDS | | | | | | |
| | RESIDENTIAL | 8600 | LOW-FLUSH TOILETS | 5000 | 750000 | 150 |
| | INDUSTRIAL | 14700 | WATER AUDITS | 7000 | 25000 | 8 |

| YEAR | ORIGINAL SUPPLY | ORIGINAL DEMAND | PLAN STEP SEQUENCE | RELEASE | RELEASES SUPPLY | RELEASES DEMAND | UPDATED SUPPLY | UPDATED DEMAND | RESERVE |
|---|---|---|---|---|---|---|---|---|---|
| YEAR 1 | 420000 | 450000 | | | 15000 | 7000 | 435000 | 443000 | 10000 |
| | | | 1 | PRIOR RIGHTS | 10000 | | | | |
| | | | 2 | RESERVED RIGHTS | 5000 | | | | |
| | | | 3 | WATER AUDITS | | 7000 | | | |
| YEAR 2 | 435000 | 443000 | | | 14000 | 0 | 449000 | 443000 | 6000 |
| | | | 4 | SETTLING | 14000 | | | | |

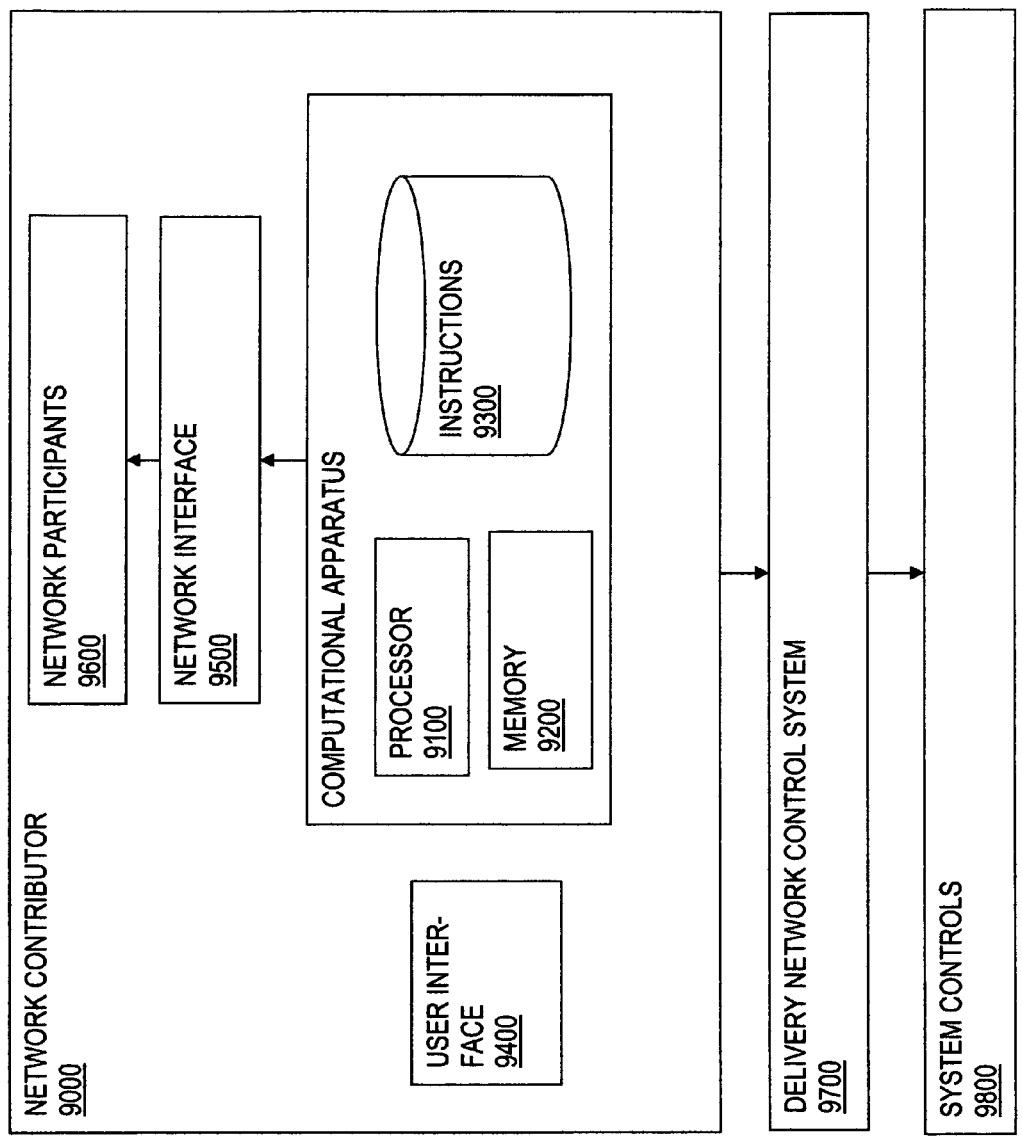

METHOD FOR FORMULATING A PLAN TO SECURE ACCESS TO LIMITED DELIVERABLE RESOURCES

PRIORITY CLAIM

The claims and invention herein described claim a priority application date consistent with the filing date of provisional patent 60/919,202 filed Mar. 20, 2007.

BACKGROUND OF THE INVENTION

1. Field of the Invention

The field of the invention relates to decision-making processes for securing access to limited resources.

2. Description of Related Art

The advent of electronic computational devices has seen a related application of that technology to the field of resource-related problem-solving and decision-making. In the field of strategic planning, there exist methods for optimizing the use of resources across an organization in the form of resource leveling. In the field of telecommunications, there exist methods for "monitoring the resources of a telecommunications network, including performing functions such as initial network planning, frequency allocation, predetermined traffic routing to support load balancing, cryptographic key distribution authorization, configuration management, fault management, security management, performance management, and accounting management." (ATIS Telecom Glossary 2000, T1.523-2001). The field of traffic engineering is similarly interested in the management of traffic flow along a transportation network in a safe and efficient fashion. In the field of natural resources and particularly in the area of water resource management, resource-related analysis and management tools can be divided into several general categories. Many of these same general categories exist in different embodiments within other fields of resource management including resource forecasting tools for forecasting the availability of supplies, flow characterization and distribution analysis tools for describing flows and pressures through a delivery network, system control and data acquisition systems for monitoring and controlling the flow of a resource within a delivery system, stakeholder economic analysis tools for assisting in negotiating resource use, financial analysis tools for determining costs related to resource acquisition and management, geographic information systems to view, store and analyze resource data from a geographic perspective, and integrated resource planning tools that incorporate a variety of operational inputs in an attempt to produce some optimal use of resources. Some of these tools include multiple stakeholder evaluations and some economic analysis. A few produce theoretical optimal allocation schemes based on certain market assumptions.

Such resource management tools are seeing increased use as a means to manage and optimize the use of resources. However, in the face of decreasing supplies and increasingly limited options for obtaining needed resources, there is a developing and obvious need for systems answering the question "What is preventing delivery of the resource, to what extent, and how do we best release the supply?" in a clear methodical fashion.

Some of the embodiments of the tools above and the regular exercise of engineering practice provide precursory information that would lend itself to formulating a systematic plan, but no current method applies this question and provides a solution as part of a formalized, generally extensible, systematic and methodically applied problem-solving technique generally applicable to resource supply and demand problems.

SUMMARY OF THE INVENTION

In answering the question, "What is preventing delivery of the resource, to what extent, and how do we best release the supply?" the invention extends and generalizes the use of impact calculations as a means for deriving a prescriptive course of action commensurate with the inquiring entities' objectives and resources. Constraint methods are applied to the delivery system operable to calculate the impacts of the constraint on the delivery of the resource. Calculation of impacts for each of the constraints is then coordinated over the delivery system. The inquiry by the invention is most typically applied over a period of time whereby impacts are calculated for each selected time step within a period of time. Impacts on supply resulting from a constraint are calculated for each constraint in terms of one or more of the quantity, intensity, incidence, probability, and frequency of loss, location or some derivative thereof for each time step.

Once constraints are identified and impacts calculated, candidate release mechanisms are identified for releasing the constraints. Selection of the release mechanisms is facilitated by the calculation of the "costs" of implementing each candidate release where the invention provides for the calculation of "costs" in metrics other than financial costs. The selection and calculation of a sorted parameter is then used to sort the release mechanisms in order of effectiveness in releasing quantities of the resource. A sorted parameter is any parameter or mathematical derivation of parameters associated with the release mechanisms including quantity of resource released, the cost of the release and parameters associated with the resource including availability, demand, quality and the associated probabilities of each parameter.

Related to this is a an additional utility whereby the selection and phasing of release mechanisms can be further refined based on the timing of the impact, availability of the resource, effectiveness of the release, the ability of the entity to access the resource and other factors including time-related factors affecting the constraint and the immediate availability of the resource.

The invention is further extended in a recursive fashion against constraints on the operation of releases allowing for the development of release solutions that meet a set of conditions set by the user.

Other accessory claims are the substitution or conversion of the primary resource to one or more other resources whose presence, availability, and/or quality are affected by the primary resource under consideration. Such conversions facilitate the use of the invention across multiple interests as might be the case when the commodity of interest for one group might be water but for another might be the number of salmonids able to spawn annually in a particular reach of a creek. The results of the analysis can be expressed in terms of either water or salmonid spawning success.

The invention contemplates the option of users grouping constraints, impacts, and release mechanisms into generalized categories per their needs and preferences and/or as made available as standard categories under various embodiments of the invention. Such categories can be utilized to provide the user with a "step-like" sequence of assessment wherein like constraints, their impacts and associated release mechanisms are associated together as a simplifying method for calculations, evaluation, analysis and presentation.

The invention's utility also extends to the cooperative identification of steps optimized to satisfy the collective needs of multiple parties. In general, this is achieved by deriving a particular set of prescriptive actions for each user or participant and then optimizing across the various solutions to arrive at a mutually agreed-to set of steps. In some embodiments the results collected and processed from repeated analysis for multiple entities and resources will be the means for producing a traditional resource management plan.

Though the invention can be applied in its simplest form against the delivery of a resource from point A to point B, it will be more typically employed across a configurable and extensible network environment. In some embodiments, such a network may reside as a component within the embodiment. In others, the invention will be applied to an external network by either adopting a copy of the pertinent features of the existing network and making necessary modifications and additions, or by dynamically querying and interacting with the external network. The invention may also be applied across distributed networks wherein the data describing the parts of the network and their associations to each other are held, updated, and manipulated in separate locations.

Application of the invention is not dependent upon the particular type of network used and depends only upon the assignment of constraints on the flow of one or more substances, qualities or symbolic quantities or qualities wherein the network represents the flow of that substance or symbolic quantity or quality. The constraints are anything that restricts or obstructs the flow of the "resource" and may be related to the physical qualities or elements of the network or may be external to the actual delivery mechanism. They can include restrictions gradually or spuriously applied over time and/or distance.

The mode of employment of the invention includes any non-networked and networked application including the use of the invention over the internet or through modes of electronic and telecommunication modes where such means can be used for all functions within the invention including searching out, identifying, selecting, downloading, uploading or assigning elements of the representation of the delivery system, constraints, releases methods, calculation methods, and methods for selecting and ordering the application of release mechanisms into a series of steps or course of action.

Though lending itself particularly useful towards securing access to physical resources, the invention can also be generally applied to develop a plan to assist in ensuring the delivery of any resource or substance from one location, real or imagined, to another location, real or imagined. Similarly, the invention can also be applied in the opposite sense in which the intent is to prevent delivery of the resource. This, for example, would be the case in a situation where a community was attempting to eliminate pollution of their streams with phosphates. Under such embodiments, the role of constraint and release mechanisms are reversed or alternatively, the resource becomes a negative resource where employing a constraint restricting the delivery of the non-resource is effectively the same as employing a mechanism that provides for the delivery of the resource and applying a release is effectively the same as providing a constraint on delivery of the resource.

The invention is expandable and contemplates wide and varied application across multiple fields many of which are yet to be introduced or fully developed. As such, the method of the invention consists of the computational framework described above wherein multiple and varied methods for the identification, assignment, computation, selection, categorization, and ordering of constraints, impacts, and release mechanisms separate and distinct from the invention may be designed for and/or employed by the invention as a means to producing its results. The generation of results as a result of interaction between the invention and other methods may be incorporated into the invention by direct contribution from the other methods or through intermediate means including the "lookup" of results or manual input of results. This is consistent with the invention's claim to a unique extension of the art as a generally applicable method for the utilization of impact results in the context of an extensible network environment as a generally applicable decision-making methodology.

As a means to facilitate interaction between various methods and the invention and between methods, the invention incorporates a common table of values wherein values can be dynamically updated by the invention and other methods.

As an additional means to facilitate interaction between various methods and the invention and between methods, the invention also provides for the interaction with external models operable to calculate delivery system and resource properties for the purpose of assembling solutions by coordinating and directing an external model along with the execution and calculation of impact calculation and release methods.

Finally, the invention includes a graphical user interface more generally applicable to the embodiment of the invention as applies to the field of water resources. The interface includes a number of features that reflect and complement the utility of the invention. Such features are more specifically described in the detailed description of the invention to follow.

The usefulness of the invention as a practical method for setting a course of action for securing access to critical supplies in an environment of scarce resources is readily apparent. Likewise, the various applications of this methodology as a general problem-solving method for producing a plan for increasing the supply of limited resources to meet demands is readily apparent and those skilled in the art will be able to make various modifications to the described embodiments of the invention to address similar applications in other fields.

Though the forgoing description favors a description of the application of the invention against a natural resource, the invention is similarly applied to any field where access to a resource is needed whether it is telecommunications bandwidth, political exposure, public funding, perceived qualities, etc. It is intended that any systematic and methodical application of the procedures provided by way of example through the various described embodiments shall fall within the scope of the invention. This shall include any method or procedure wherein constraints are assigned, released and those releases subsequently ordered into a course of action or series of steps.

BRIEF DESCRIPTION OF THE DRAWINGS

Preferred embodiments of the invention are described below with reference to the following accompanying drawings.

The following illustrations of the invention will serve to illustrate its form and function and, in conjunction with the foregoing description and claims, provide a full understanding of the principles and application of the invention.

FIG. 8 is a symbolic representation of a network and illustrates the sub-processes of the release application process 200 wherein constraint releases are applied to one constraint as an example.

FIG. 9 illustrates results of the operation of the invention through process 200.

FIG. 11 illustrates results of the operation of the invention through process 300.

FIG. 13 illustrates results of the operation of the invention through process 410.

FIG. 14 illustrates results of the operation of the invention through process 420.

FIG. 16 illustrates the results of applying constraints on releases.

FIG. 18 illustrates results of the operation of the invention applied over two time steps.

FIG. 19 illustrates the recursive application of the invention to release constraints.

FIG. 21 illustrates results of the recursive application of the invention to release constraints.

FIG. 23 illustrates results of the invention to compile values over a plurality of time steps.

FIG. 37 shows a computer screen for presenting the impacts associated with constraints.

FIG. 38 shows a computer screen for presenting the candidate releases for releasing each constraint.

FIG. 39 shows a computer screen for presenting a set of steps for securing access to the limited resource.

FIG. 41 shows an apparatus operable to execute the methods of the invention.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
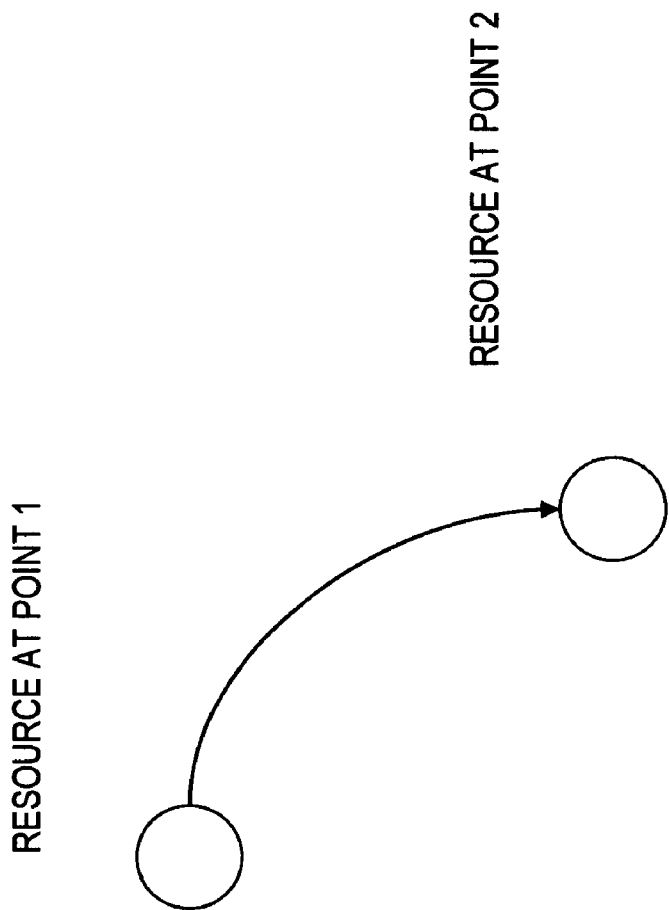
FIG. 1 is an illustration of the resource, the subject of the operation of the invention.

Referring to FIG. 1, an illustration of a resource, the subject of the operation of the invention, having a magnitude and capable of being displaced from one point to another. In the preferred embodiment, the displacement of the resource occurs as a flow from one point to another over a period of time wherein the resultant quantity of the resource displaced is the total flow displaced over the period of time.

Figure 2:
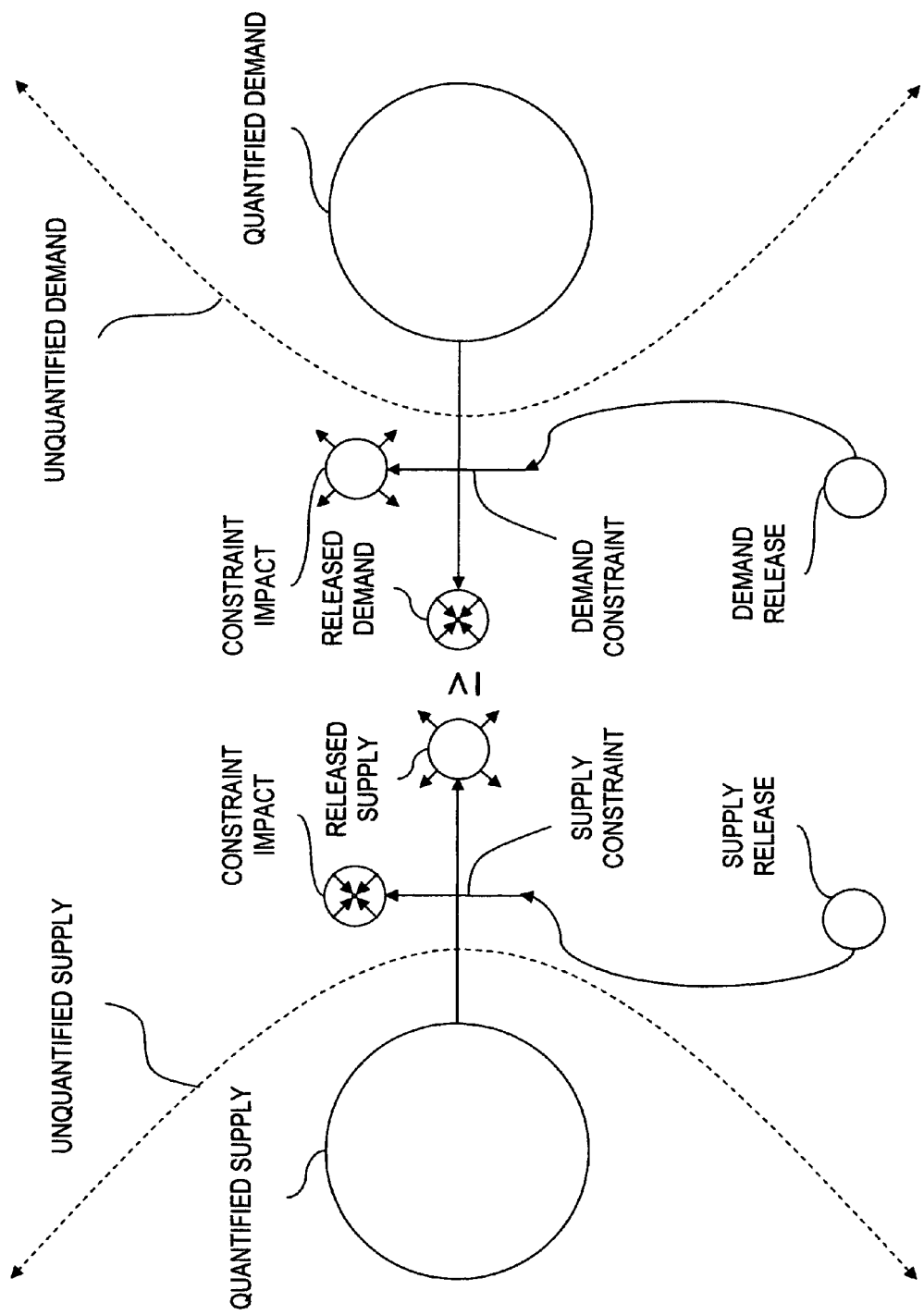
FIG. 2 is an illustration of the conceptual basis of the invention.

Referring to FIG. 2, an illustration of the conceptual basis for the operation of the invention wherein delivery of a resource from one point to another point is restricted by a supply constraint wherein the available supply is decreased by some constraint impact. Similarly, the demand for a resource is restricted by a demand constraint thereby limiting the demand by some constraint impact. The illustration also shows the operation of supply releases upon the supply constraints and demand releases on the demand constraints by means of diagonal arrows indicating the increase or decrease in the magnitude of the constraint impacts wherein the impact of the supply constraint is decreased to yield an increase in available supply and wherein the impact of the demand constraint is increased to yield a decrease in demand for the resource. The operation of the invention is to provide a plan for applying releases to ensure that available supply is at least equal to the demand for the resource where the supply and the demand for the resource may vary over time.

Still referring to FIG. 2, the dashed lines identified as the "Unquantified Supply" illustrate that the invention may also be operated against a supply that is not quantified or that is considered infinite as long as the initial released supply can be quantified. Similarly, the dashed lines identified as "Unquantified Demand" illustrate that the invention may also be operated against a demand that is not quantified or considered infinite as long as the initial released demand can be quantified.

Figure 3:
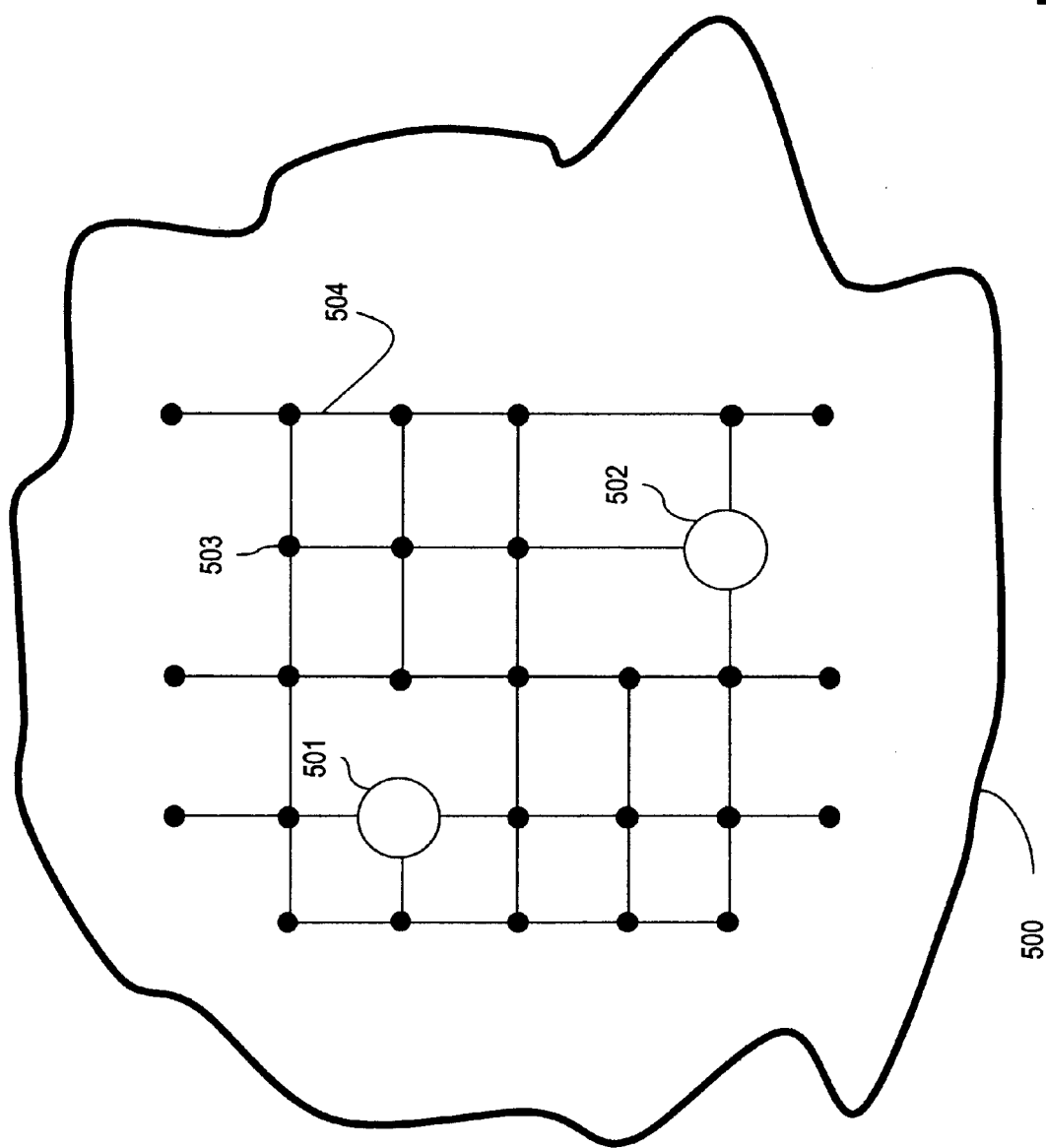
FIG. 3 is an illustration of a delivery system for the resource.

Now referring to FIG. 3, a close-up view of a representation of a delivery system 500, hereinafter referred to as a "delivery system" wherein is depicted a plurality of points 503 connected by a plurality of paths 504 for displacement of the resource wherein is also depicted a resource 501 at one point displaced to a second point and illustrated as resource 502.

Figure 4:
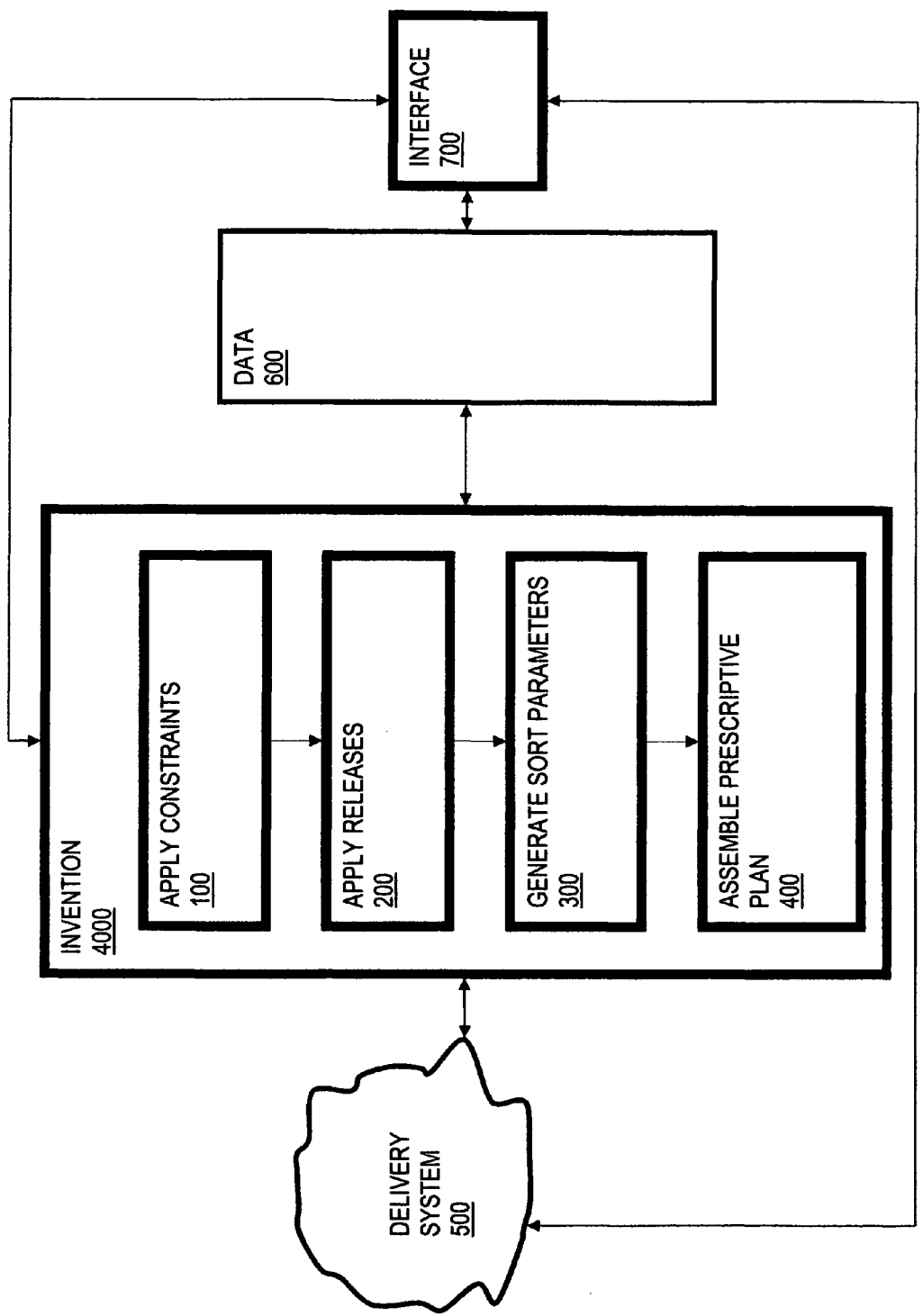
FIG. 4 is system level simplified block diagram of the invention showing a decision-making and/or control method for securing access to critical supplies.

Referring to FIG. 4, a constraint-driven method for formulating a plan to secure access to limited resources over a delivery system is shown in its preferred embodiment including four main processes operating on a representation of a delivery system, storing values commonly accessible by other methods outside the invention, and an interface. Process 100 applies constraints to delivery system 500 and calculates the impacts of the constraints including the reduction in supply where constraint impacts can be changes in other intrinsic values related to the constraint including the incidence of the constraint's bounding action on the supply of the limited resource. Process 200 applies releases operable to reduce the impacts of constraints on the supply. Process 300 generates a parameter from values associated with the releases applied in Process 200. Process 400 generates a series of steps based on parameters derived from the operation of the release mechanisms. All four processes interactively access and update values held in one or more data records 600 during their operation. Throughout these processes, results are displayed with some opportunity for modification through the interface, Element 700.

Still referring to FIG. 4 where processes 100, 200, 300, and 400 are present in the preferred embodiment, process 100 may be implemented as a method apart from processes 200, 300, and 400 operable to apply constraints; process 100 and process 200 collectively may be implemented as a method apart from methods 300 and 400 operable to apply constraints and releases; processes 100, 200, and 300 may be implemented as a method apart from method 400 operable to apply constraints, apply restraints, and generate sort parameters; all preceding combinations may be implemented as embodiments of the invention by other methods.

Figure 5:
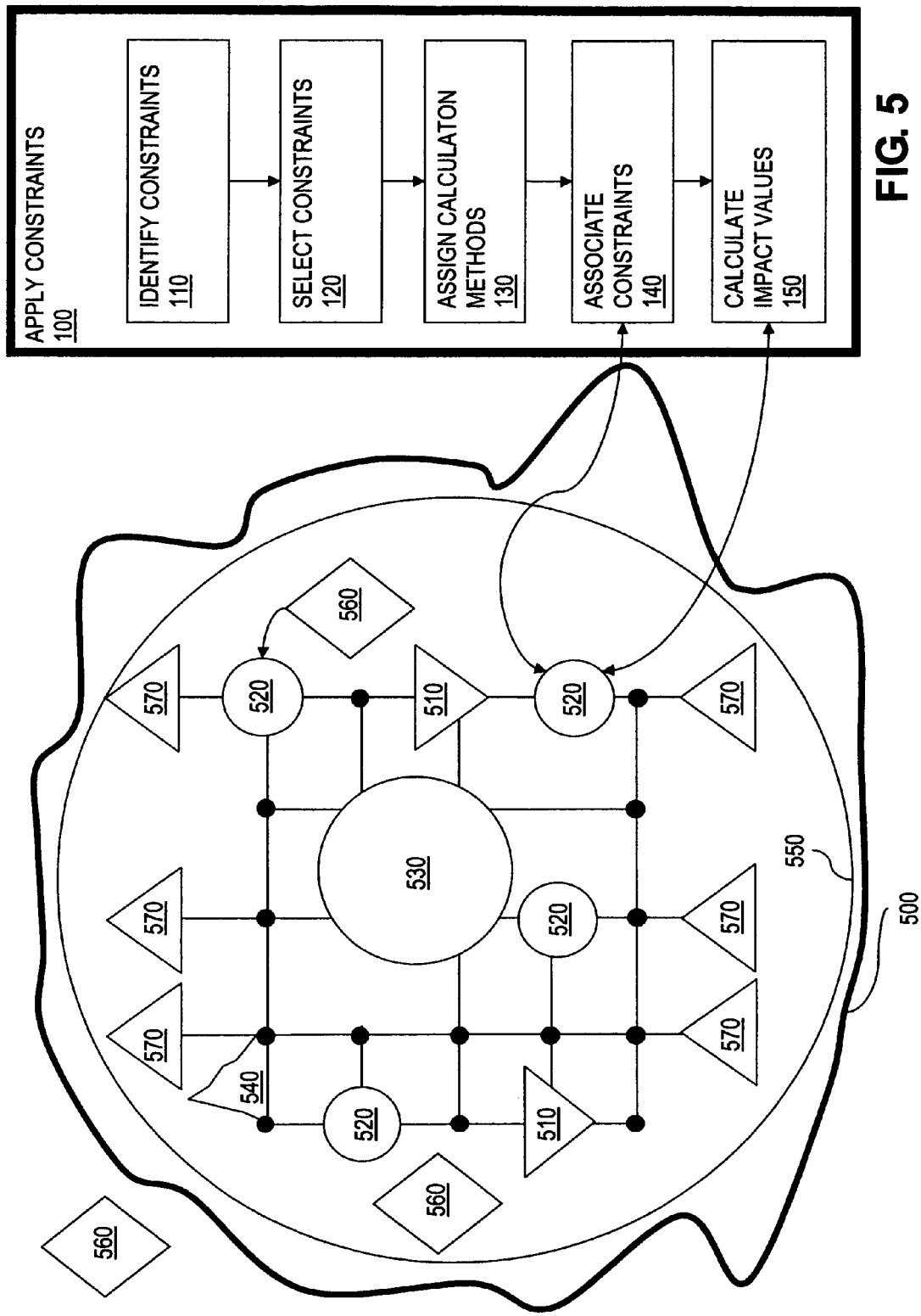
FIG. 5 is a symbolic representation of a network and illustrates the sub-processes of the constraint application method wherein constraint are applied to one constraint as an example.
Figure 10:
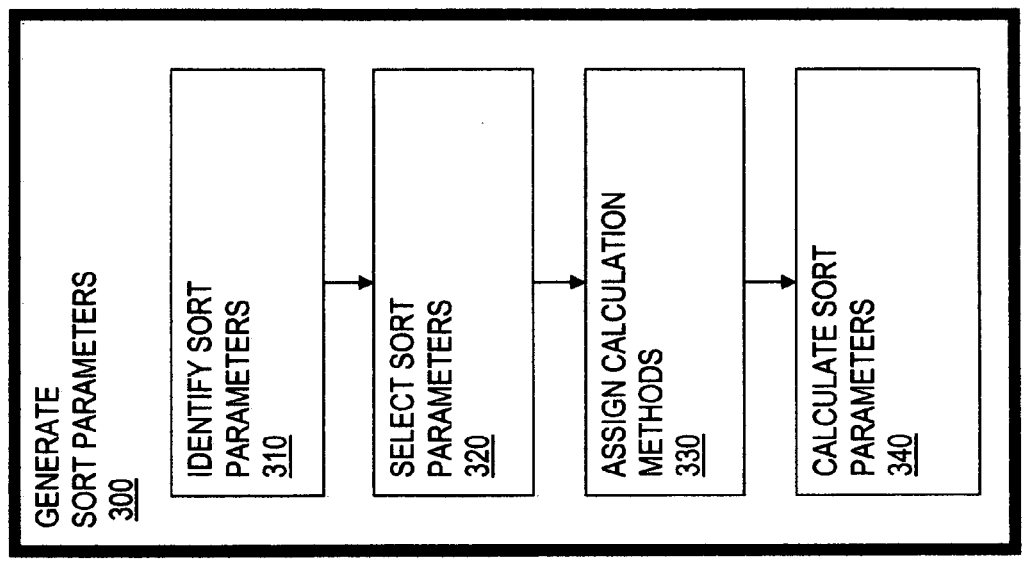
FIG. 10 illustrates the sub-processes of the generate sort parameters process 300.
Figure 12:
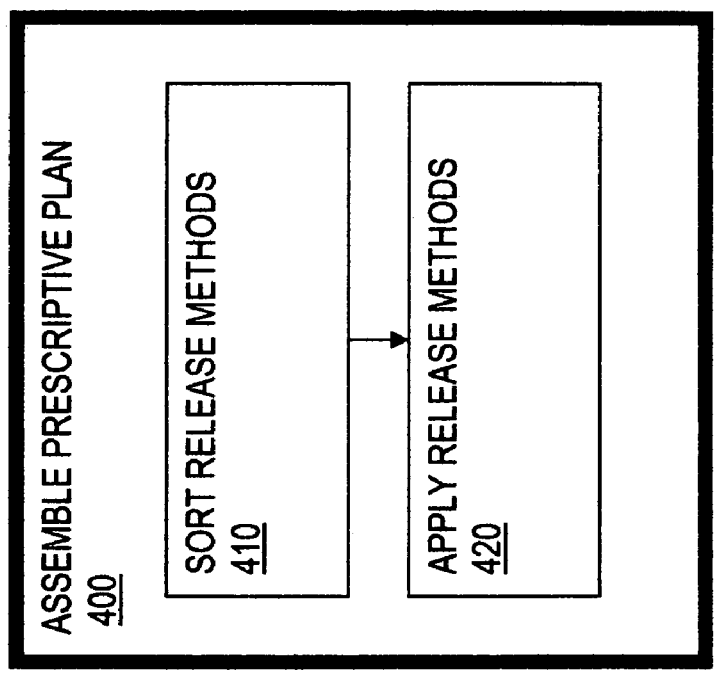
FIG. 12 illustrates the sub-processes of the prescriptive plan assembly process 400.

Still referring to FIG. 4, the sub-processes of process 100 are illustrated in FIG. 5 as sub-processes 110 though 150; the sub-processes of process 200 are illustrated in FIG. 8 as sub-processes 210 through 250; the sub-processes of process 300 are illustrated in FIG. 10 as sub-processes 310 through 350; and the sub-processes of process 400 are illustrated in FIG. 12. The details of the operation of these sub-processes are described in the descriptions of FIG. 5, FIG., FIG. 10, and FIG. 12 as well as elsewhere. Furthermore, the sub-processes of each process may be inter-dispersed with the sub-processes of other processes where such inter-dispersion preserves the relative order of operation of the sub-processes of any process. Furthermore, in cases where the order of a sub-process is not essential in preserving the integrity of the invention, the orders of such sub-processes may be altered.

Referring now to FIG. 5, a close-up view of delivery system 500 is shown for the purposes of illustration along with elements of the interaction of process 100. Supply system elements 510 are shown on the network as locations where supplies are introduced into the delivery system wherein supplies are the released supplies of initial quantified or unquantified supplies. Constraints 520 indicate point-location constraints where supplies are restricted in their flow through the delivery system. Constraint 530 is an example of a constraint applied over a region of the delivery system. Constraint 540 is an example of a constraint applied to a path between nodes of the network wherein the action of the constraint varies over the length of the path in some fashion. Constraint 550 represents a constraint applying to the whole of the delivery system. Constraints 560 represent constraints operable to bound the supply of resource(s) by bounding the use of at least one release method whose operations are not effective in meeting at least one condition. In the preferred embodiment these are a set of conditions that must be met by the collective application of at least one release in order for the plurality of releases to be applied. Constraints 570 represent demands, wherein initial demands are the released demands of initial quantified or unquantified demands.

Still referring to FIG. 5, sub-processes of process 100 are shown in their operation and application against a single constraint within the delivery system wherein process 100 starts with process 110 identifying a group of candidate constraints that may be operative to bound the supply of limited resources in the system; process 120 is operative to select a sub-group of candidate constraints identified in process 110 for association with elements of the delivery system in process 140. Methods for calculating the impacts of the constraints are identified selected and then associated with the constraints with which they are operable to determine impact values in sub-process 130. The sub-processes of process 130 are more clearly described in FIG. 6. Though shown in the order of its preferred embodiment, process 130 may performed any time after process 110 and before process 150. Process 150 is operable to determine the quantity bounded by the constraints as well as other constraint impact values wherein process 150 commonly interacts with the delivery system to set values and observe results in a continuing method until the determination is made. Process 100 is ultimately operable against all constraints associated with the delivery system where such evaluation is coordinated by sub-process 150.

Still referring to FIG. 5, the operation of sub-process 140 is shown associating a constraint with an element of the delivery system and the operation of sub-process 150 is shown calculating the impact values associated with the same constraint. In other embodiments of the invention, the methods of processes 110, 120, and 130 similarly access and operate on the elements of the delivery system.

Figure 6:
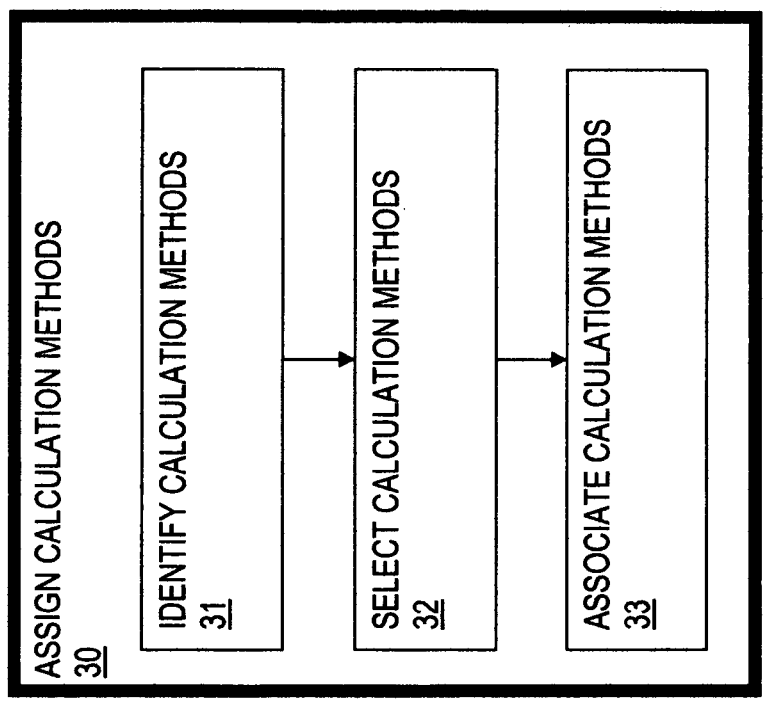
FIG. 6 illustrates the sub-processes of the general calculation method assignment processes 130, 230, and 330.

Now referring to FIG. 6 the general method of assigning calculation methods common to processes 130, 230, and 330 is illustrated, wherein process 30 is initiated with sub-process 31 identifying a group of calculation methods operable to calculate values for the process 100, 200, or 300, process 32 selecting calculation methods to be associated with methods of the calling sub-process, and process 33 associating the calculation methods with the methods of the calling process 100, 200, or 300.

Figure 7:
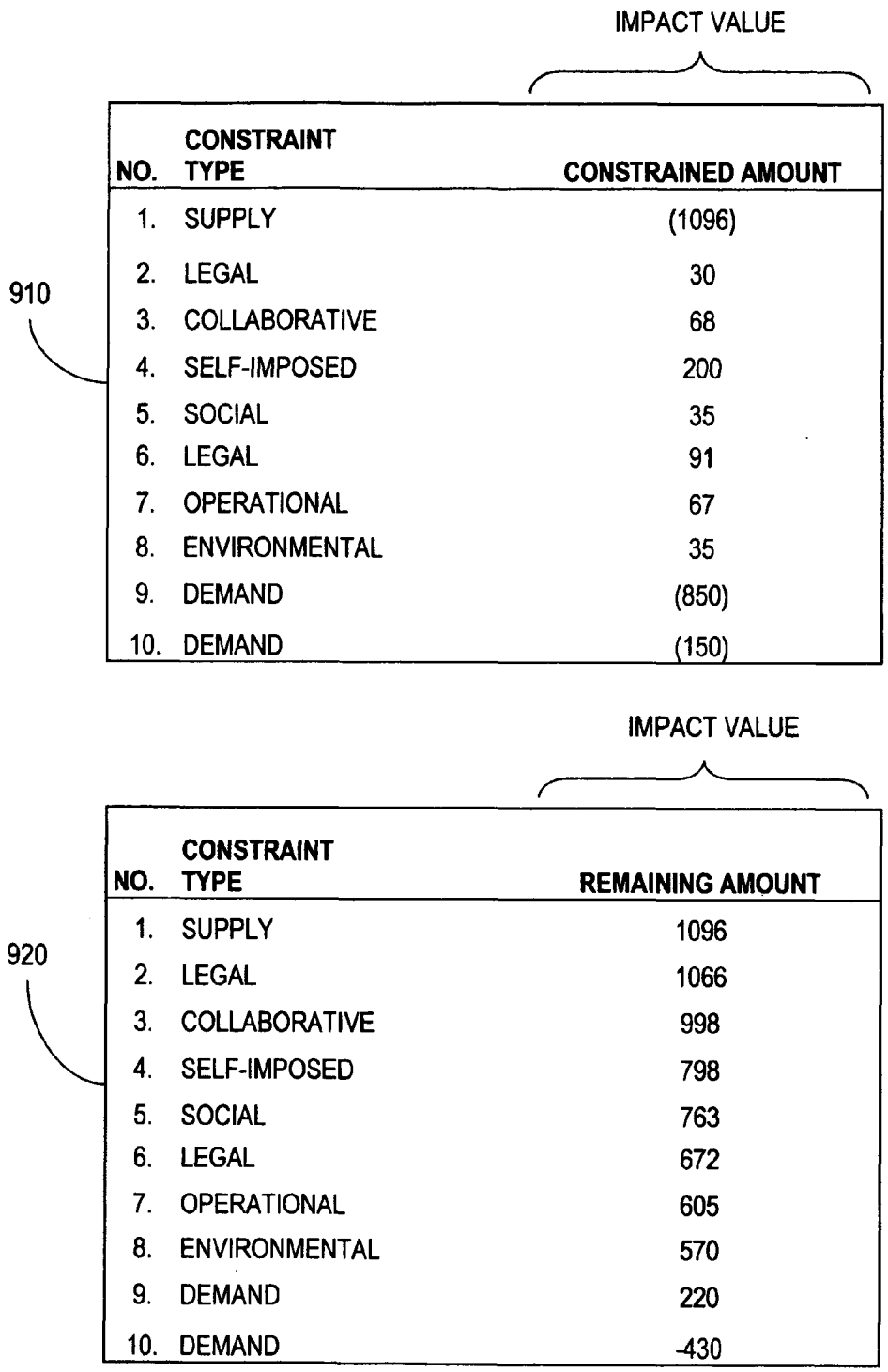
FIG. 7 illustrates results of the operation of the invention through process 100.

Now referring to FIG. 7, an illustration of two representations of the results of the operation of the invention through process 100 wherein each representation shows an enumerated group of constraints categorized by a type of constraint followed by an impact value generally displaying the amount of the limited resource bounded by the constraint. Table 910 illustrates the general method of displaying impacts herein illustrated with bounded quantities for the preferred embodiment where the values for supplies and demands are expressed as the result of the bounding influence of the constraint imposed upon the supply or demand. Parentheses are used in table 910 to indicate supplies or demands that cannot be quantified where other notation and methods of differentiating these values are within the scope of this invention.

Still referring to FIG. 7, table 920 illustrates a display of the constraint impact values associated with the bounding of the supply of limited resources as the remaining amount of resource available due to application of the constraints in a sequential order. One skilled in the art would readily recognize that multiple constraint impact values may be calculated for each constraint and that the techniques for manipulating and presenting the values and descriptive information associated with the constraints will be dependent upon the type and scope of constraint encountered, the embodiment of the invention, and the preference of the user and that there are many techniques for displaying the impact values produced by the invention.

Referring now to FIG. 8 a close-up view of a delivery system is shown for the purposes of illustration along with elements of the interaction of process 200 wherein description and operation of the delivery system and constraints is the same as described for FIG. 8.

Still referring to FIG. 8, the operation of sub-processes of process 200 are shown in relation to a single constraint wherein sub-process 220 is operative to select a sub-group of candidate release methods identified in process 210 for association with the plurality of constraints identified in process 100 through process 240. For the purposes of illustration the application of a single release to a single constraint is depicted as a second concentric circle 521 around the constraint.

Still referring to FIG. 8, methods for calculating the release values of the release methods are identified, selected, and then associated with the constraints with which they are operable to determine release values in sub-process 230. The sub-processes of process 230 are more clearly described in FIG. 6. Though shown in the order of its preferred embodiment, process 230 may be performed any time after process 120 and before process 250. Process 250 is operable to determine the quantity of supply released by the release method or the quantity of demand decreased by the release method as well as other release values wherein such operations commonly interact with the delivery system and constraints to set values and observe results in a continuing method until the determination is made. Process 200 is ultimately operable against all constraints associated with the delivery system where such evaluation is coordinated by sub-process 250. One skilled in the art would readily recognize that the techniques for calculating release values will be dependent upon the type and scope of constraint encountered and that there are many techniques for implementing the sub-processes of process 200 which could be similarly implemented without departing from the scope of this invention.

Now referring to table 930 of FIG. 9, an illustration of one representation of the results of the operation of the invention through process 200 showing an enumerated group of constraints categorized by a type of constraint associated with a release method operable to reduce the bounding action of each constraint and displaying release values associated with each release including the amount of the limited resource bounded by the constraint released by the operation of the release on the constraint. As illustrated in table 930, the operation of process 200 is operable to produce releases associated with more than one constraint and multiple releases associated with one constraint. One skilled in the art would readily recognize that multiple release values may be calculated for each constraint and that the techniques for manipulating and presenting the values and descriptive information associated with the releases will be dependent upon the type and scope of constraint encountered, the embodiment of the invention, and the preference of the user and that there are many techniques for displaying the release values produced by the invention.

Referring now to FIG. 10, a more detailed view of process 300 is shown with its various sub-processes. A sort parameter derivable from types of values shared by the plurality of candidate release mechanisms under consideration for the purposes of sorting the candidate release mechanisms in a preferred order is identified in process 310; process 320 selects at least one sort parameter to be used in sorting the releases in a preferred order; and process 340 generates the sort parameter(s) selected in step 310. Methods for calculating the sort parameters are identified, selected, and then assigned to the sort parameters for which they are operable to determine release values in sub-process 330. The sub-processes of process 330 are more clearly described in FIG. 6. Though shown in the order of its preferred embodiment, process 330 may performed any time after process 310 and before process 340. One skilled in the art would readily recognize that there are many techniques for implementing the sub-processes of process 300 which could be similarly implemented without departing from the scope of this invention.

Now referring to table 940 of FIG. 11, an illustration of the results of the operation of the invention through process 320 wherein the sort parameter for each instance of each release has been calculated from one or more of the release values where calculation also includes selecting a single release value as the sort parameter and wherein the sort parameter is associated with the instance of the release method for which it was calculated. Note that the calculation of a release value may vary for a release method applied across more than one constraint as illustrated by the sort values associated with the multiple instances of release 15 in table 940. One skilled in the art would readily recognize that multiple release values may be calculated for each constraint and that the techniques for manipulating and presenting the values and descriptive information associated with the releases will be dependent upon the type and scope of constraint encountered, the embodiment of the invention, and the preference of the user and that there are many techniques for displaying the release values produced by the invention.

Now referring to FIG. 12, a more detailed view of process 400 is shown with its various sub-processes. Sub-process 410 is operable to sort the plurality of releases by their associated sort parameters in a preferred order; sub-process 420 is operable to produce an ordered resultant group forming steps of a prescriptive plan for assisting in securing access to a critical supply. The operation of sub-process 420 includes selecting release methods with sort parameter values selected from the group of sort parameter values equal to the value of the optimum sort parameter value, closest to but less than the optimum sort parameter value, and closest to but greater than the optimum sort parameter value wherein the range of optimum sort values includes infinity and negative infinity. Furthermore the operation of method 420 involves applying the plurality of release methods operable to increase supply by releasing constraints on supply or by decreasing demand until demands for the limited resource are met and wherein release methods with release values completely applied are no longer selected and wherein releases associated exclusively with constraints with impacts completely released are no longer selected.

Now referring to FIG. 13, table 950 of is an illustration of the results of the operation of sub-process 410, the release methods are sorted in the preferred embodiment in a descending order wherein an ascending order may be utilized by other embodiments of the invention.

Now referring to of FIG. 14, table 960 is an illustration of the results of the operation of sub-process 420 showing release methods are applied in the order of their sort parameters in the preferred embodiment until demands are met wherein release methods following the meeting of the demand are not included as prescriptive steps for releasing constraints.

Figure 15:
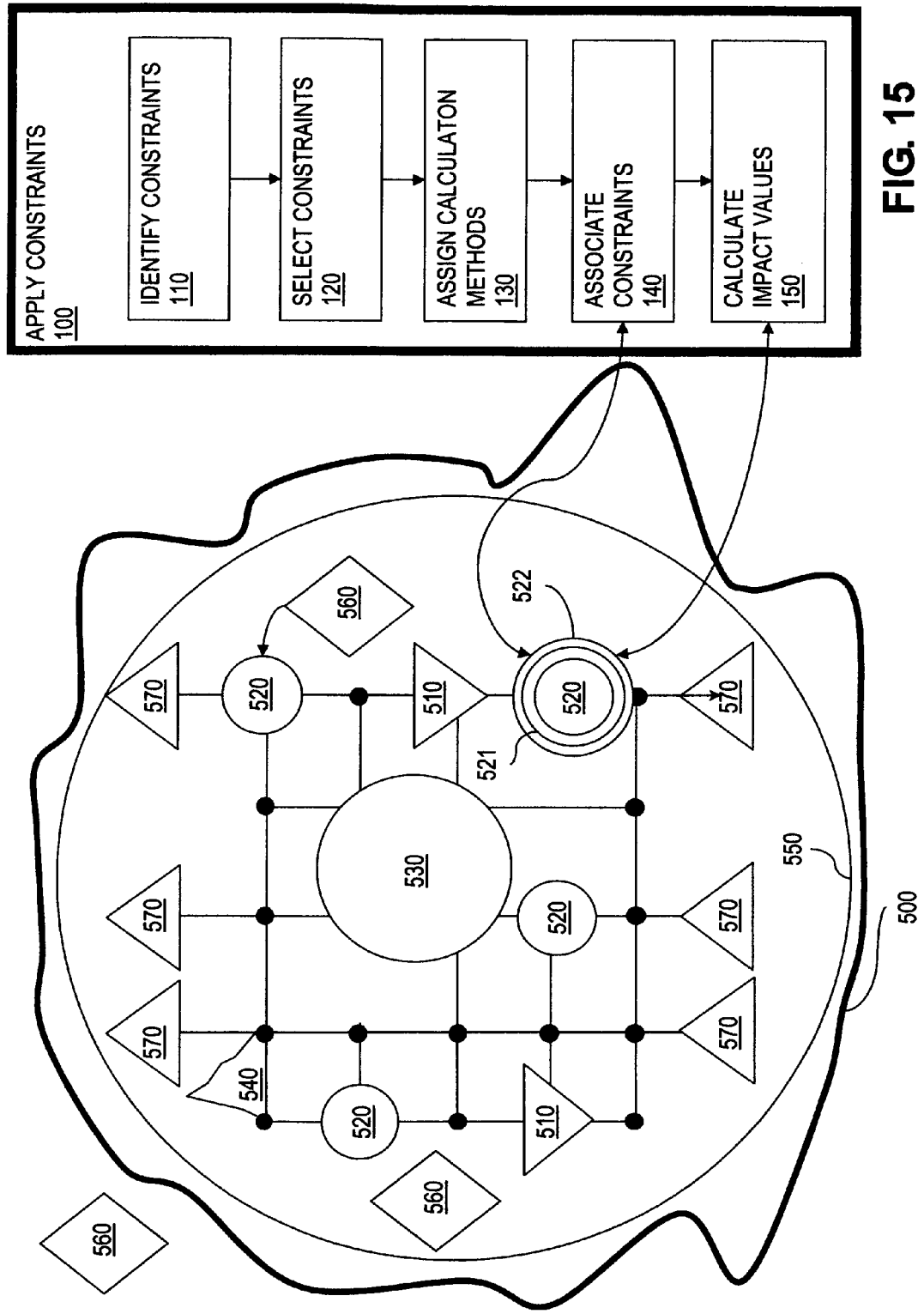
FIG. 15 illustrates the application of constraints on releases.

Now referring to FIG. 15, a close-up view of a delivery system is shown for the purposes of illustration along with elements of the interaction of process 200 wherein description and operation of the delivery system and constraints is the same as described for FIG. 8 and wherein is illustrated the further operation of the bounding the supply of the resource by bounding the use of at least one release method by a release constraint where in the preferred embodiment, the release constraint is one or more conditions that must be met if the release is to be employed. Such conditions may be, for example, a financial limitation, a general minimum state of the resource throughout the delivery system or some other condition that generally applies to all of the elements of the delivery system, or as illustrated in FIG. 15 by element 522, it may be a single condition applied against a single release previously illustrated in FIG. 8 as release 521 on constraint 520.

Still referring to FIG. 15, where in the preferred embodiment constraints on releases are a set of conditions that must be generally satisfied, constraints are applied utilizing process 100 where the identification of the constraints in process 110 is the identification of possible conditions that must be satisfied to allow use of restraint, the selection of the constraint in process 120 is the selection of those conditions that will apply to one or more elements of the delivery system, the assignment of calculation methods in process 130 is the assignment of methods operable to calculate the results required to assess whether the conditions are met, the association of constraints in process 140 is the association of the conditions comprising the constraint to one or more elements of the delivery system where constraints without a direct association with any specific element of the delivery system are applied to the delivery system as a whole, and the calculation of impact values in process 150 is the calculation of those results required to assess whether the conditions are met.

Now referring to FIG. 16, table 970 is an illustration of the results of the operation of sub-process 420 processing constraints bounding the use of at least one release method whose operations are not effective in meeting at least one condition wherein these conditions are now applied against the results of the operation illustrated in table 860 where, for the purposes of this illustration, individual releases are constrained to be operable over the date July 31 and must also have at least an 85% probability with the total cost of all release methods used not to exceed 680 cost units. Absent any further release of the total cost constraint, the total cost for all of the releases would exceed 680 cost units and only those whose sum did not exceed this amount could be considered for use in the prescriptive plan. One skilled in the art would readily recognize that there are many techniques for implementing the sub-processes of process 420 which could be similarly implemented without departing from the scope of this invention.

Figure 17:
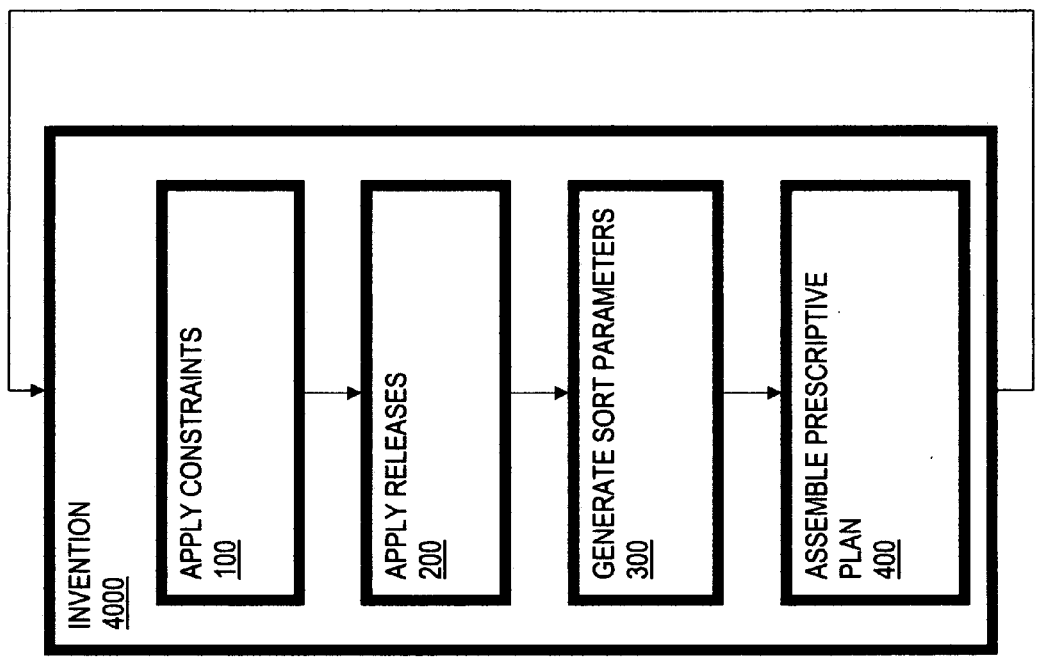
FIG. 17 illustrates the operation of the invention over a plurality of time steps.

Now referring to FIG. 17, illustrating the operation of the invention wherein the invention is operable over a plurality of time steps and wherein the application of release methods in previous time steps can modify the constraint impacts prior to the operation of the invention over subsequent time steps and wherein the release values calculated and associated in previous steps are not operable to modify the impacts of constraints prior to the operation of the invention over successive time steps and wherein operation of processes in earlier time steps operable without modification in subsequent steps are not repeated in subsequent time steps.

Now referring FIG. 18, where table 980 of an illustration shows the results of the operation of the invention through sub-process 420 over two time steps where the effective start and end dates of the release methods must span the date of the time step; where probability must be at least 85%; and where the total cost for all constraints must be less than 850 cost units. Table 880 illustrates how the release method for constraint number 6 was not used in the first time step since it did not satisfy the constraints on release methods. Similarly, if the total cost of the release methods used in either plan exceeded 680 cost units, the plan would not be accepted without further releasing constraints on the release. One skilled in the art would readily recognize that there are many techniques for implementing the sub-processes of process 420 over multiple time steps which could be similarly implemented without departing from the scope of this invention.

Now referring to FIG. 19, the operation of the invention is illustrated wherein the invention is operable to call itself in a recursive fashion wherein operation of processes in earlier recursions operable without modification in subsequent recursions is not repeated in subsequent recursions of the method. In the preferred embodiment, constraint assignments of process 100 are inherited from the originating time step for the recursion and not repeated thereafter.

Still referring to FIG. 19, in the preferred embodiment, the recursive application of the invention is applied interactively by the user or the invention against constraints on releases wherein releases on the constraints are applied in process 200, sort parameters are generated in process 300 and a plan for releasing the constraint is assembled in process 400. If releases on the current iteration of releases are still constrained, the invention may further recurse to identify releases to release the previous level of constrained releases.

Figure 20:
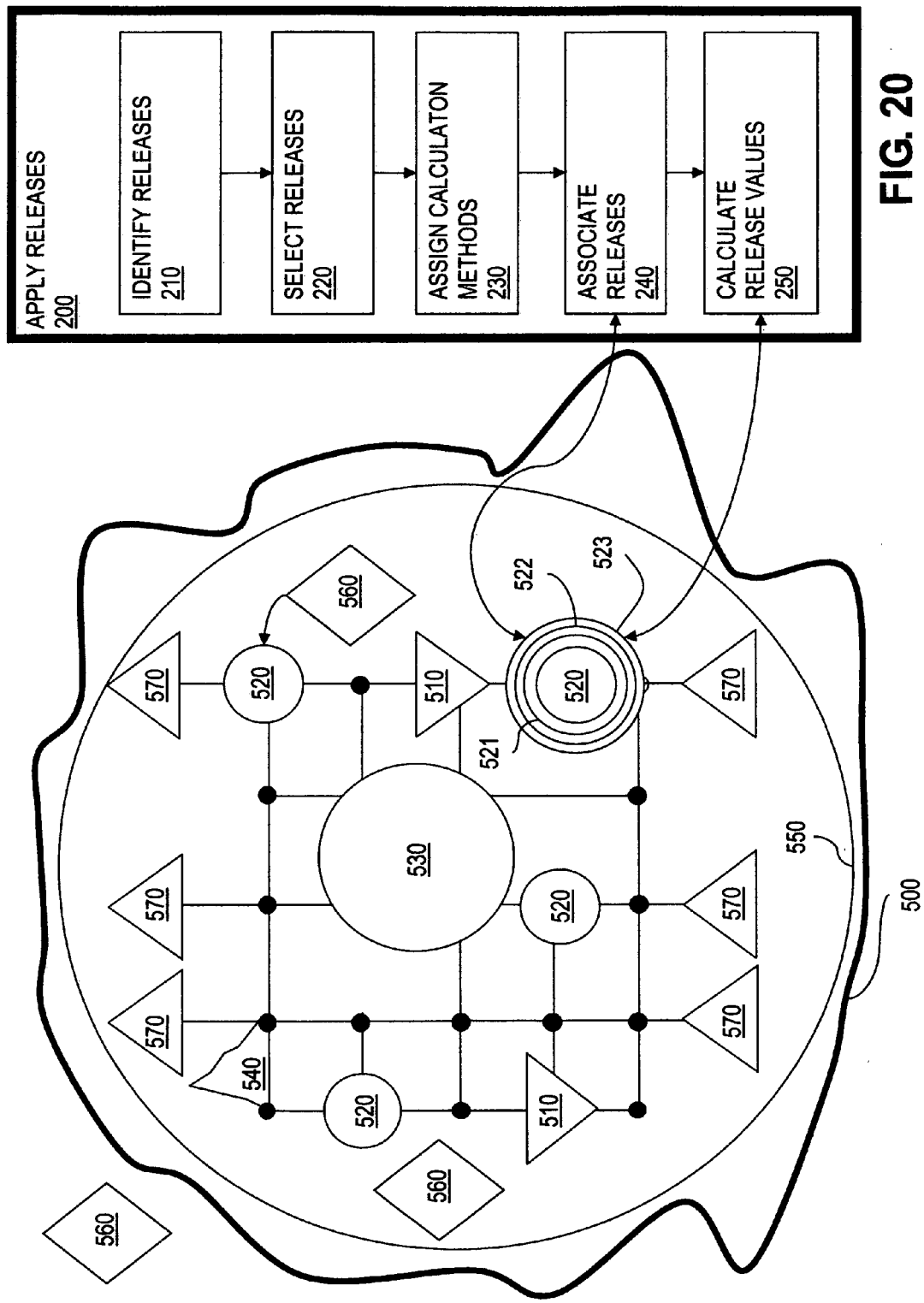
FIG. 20 illustrates a particular recursive application of process 200 in recursively applying releasing constraints on releases.

Now referring to FIG. 20, a close-up view of a delivery system is shown for the purposes of illustration along with elements of the interaction of process 200 applied in a recursive fashion to release a constraint on a release wherein description and operation of the delivery system and constraints is the same as described for FIG. 15. As illustrated in FIG. 20, element 523 is the release on the constraint 522 on the release 521 for constraint 520. In the preferred embodiment, releases are applied utilizing process 200 where process 210 is the identification of methods to release constraints on releases where the release constraint is one or more conditions that must be met if the release is to be employed. Process 220 is the selection of those releases operable to release the constraints on releases. Process 230 assigns calculation methods operable to calculate the results required to assess whether the conditions are met. Process 240 associates releases to the constraint. Process 250 calculates results required to assess whether the conditions are met. As illustrated in FIG. 19 processes 300 and 400 are operated following the operation of process 200.

Now referring to FIG. 21, an illustration showing a table 990 of results of the recursive operation of the invention through sub-process 420 similar to the operation illustrated with table 980 of FIG. 18 except that the total cost constraint on all releases has been reduced to 665 cost units. Table 990 illustrates the result of the recursive operation of the invention in applying a release to one of the releases to release the total cost constraint. One skilled in the art would readily recognize that there are many techniques for implementing recursion of the invention which could be similarly implemented without departing from the scope of this invention.

Figure 22:
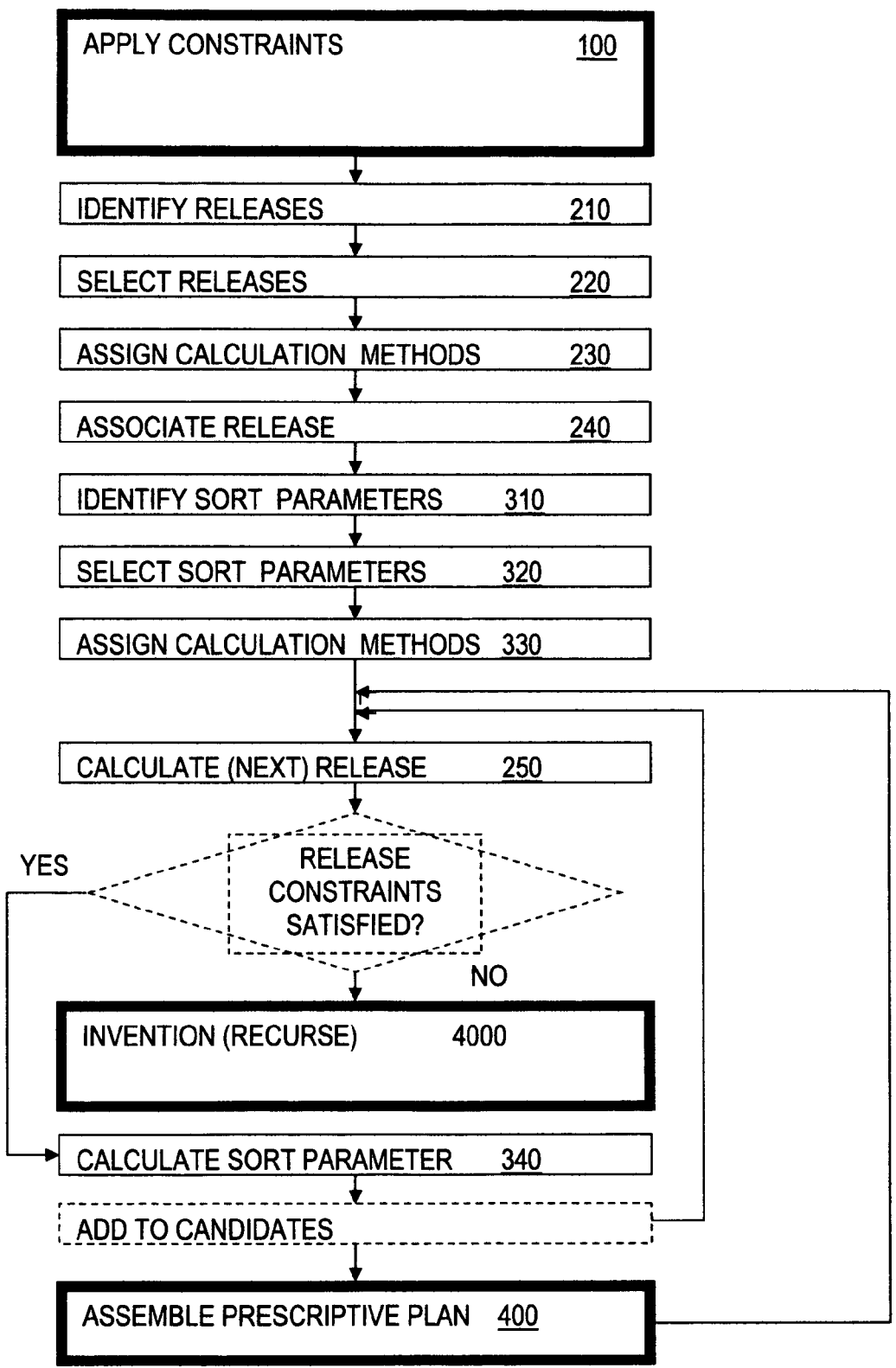
FIG. 22 illustrates the operation of the invention over a plurality of time steps operable to recursively release constraints on releases as the preferred embodiment of the invention.

Now referring to FIG. 22 showing the preferred embodiment of the invention illustrating 1) the dispersion of sub-processes within sub-processes of other processes, 2) the operation of the invention over a plurality of time steps, and 3) a recursive program call to release constraints on release methods. One skilled in the art would readily recognize that there are many techniques for implementing the invention in addition to the embodiment here which could be similarly implemented without departing from the scope of this invention.

Now referring to FIG. 23, table 995 illustrates the operation of the invention wherein the invention is operable to compile values associated with the delivery system over multiple time steps as illustrated by the compilation of daily constraint impact values on a monthly and then an annual basis.

Still referring to FIG. 23, table 995 illustrates the annual compilation of release values as applied against supply and demand constraints followed by a net value indicating how much of the release quantity exceeds or does not meet the demand.

Figure 24:
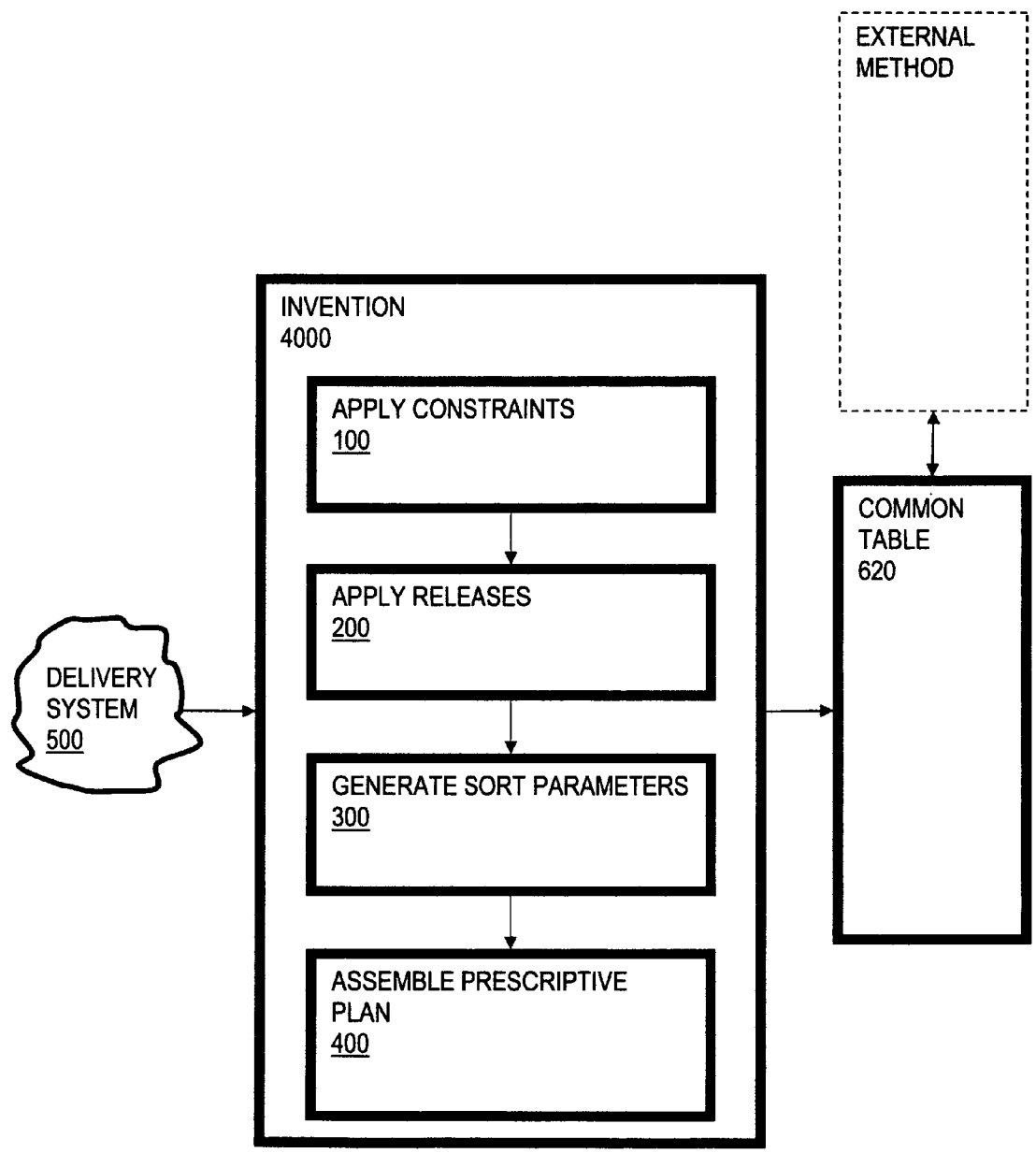
FIG. 24 illustrates the operation of the invention with a common table of values and methods external to the invention.

Now referring to FIG. 24 illustrating the elements of the invention previously described in FIG. 4 and a delivery system 500 and illustrating the operation of the invention in reading and recording descriptive information relevant to the operation of the invention in a common table 620 that is readily accessible by internal and external methods, In particular, in it's preferred embodiment the invention is operable to interact with other methods by recording and accessing constraint impact values, release values, sort values and other values intrinsic to its operation on a common table of values that can be similarly accessed by other methods.

Figure 25:
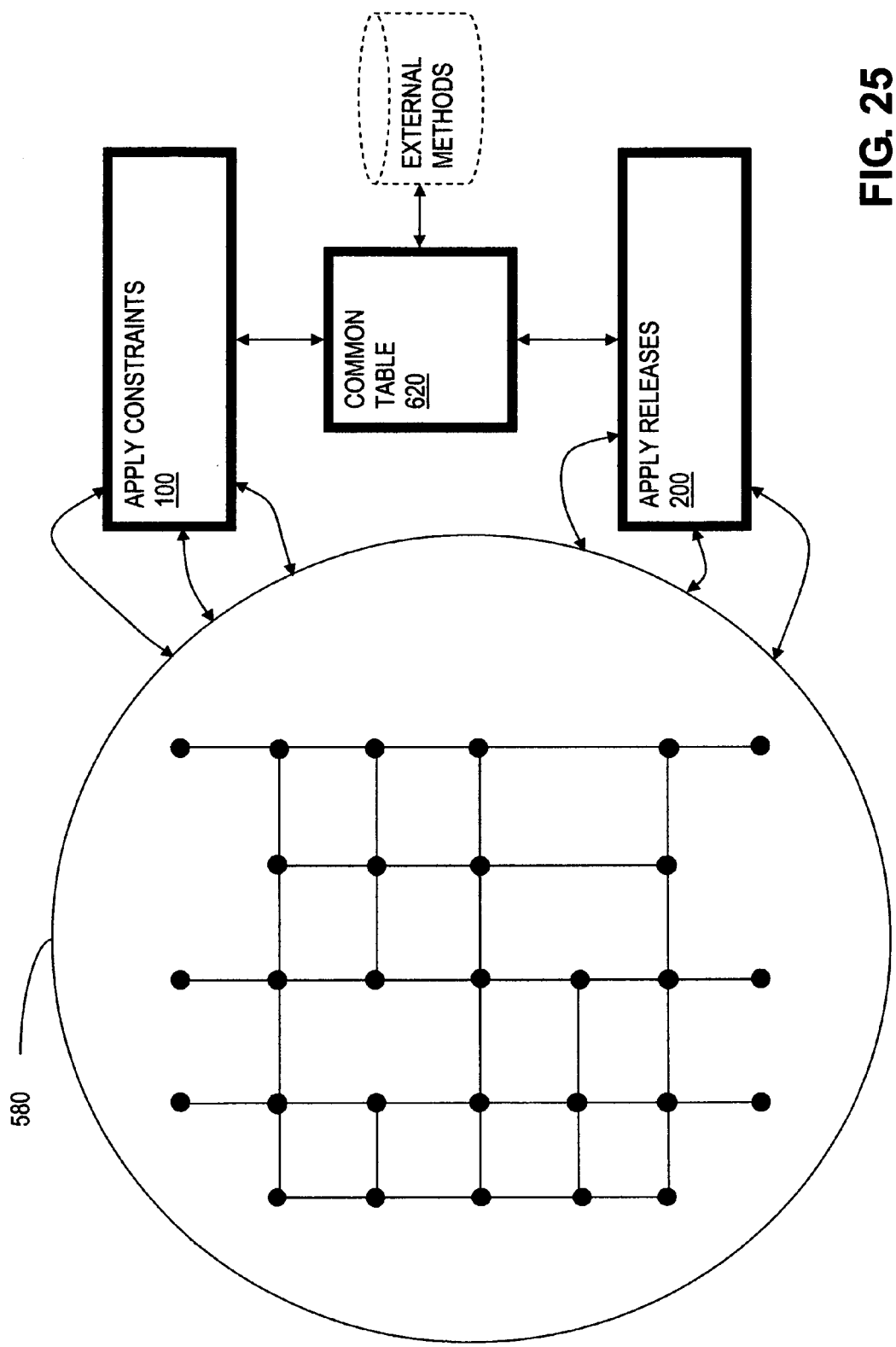
FIG. 25 illustrates the operation of the invention interacting with a model external to the invention operable to calculate delivery system properties.

Now referring to FIG. 25 illustrating the operation of the invention in its preferred embodiment monitoring, modifying, and operating a representation of a delivery system 580 operable to calculate delivery system and resource properties for the purposes of calculating values needed to apply processes 100 and 200 of the invention. In particular, in its preferred embodiment the invention is operable to interact with other methods by recording constraint impact values, release values, sort values and other values intrinsic to its operation on a common table of values 620 that can be similarly accessed and updated by other methods.

Figure 26:
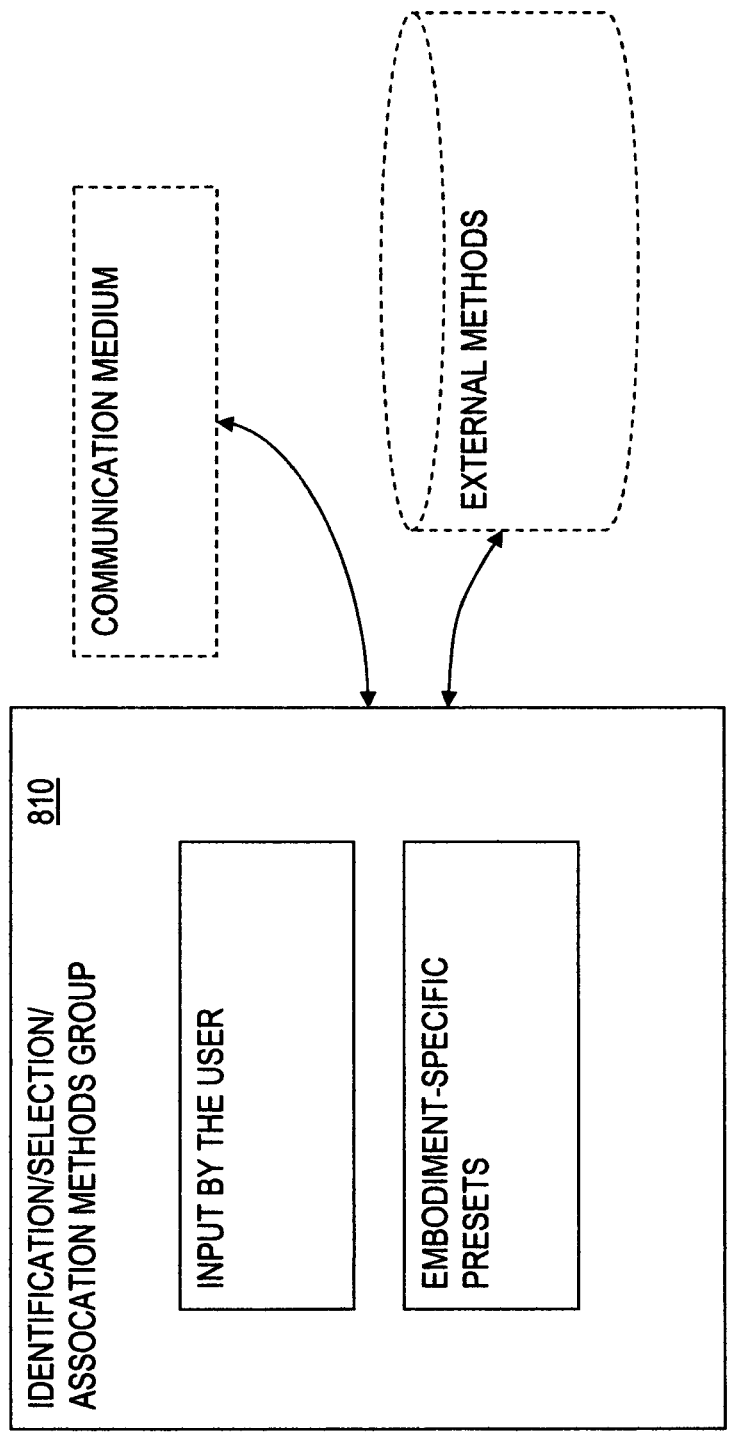
FIG. 26 illustrates the group of methods used by the invention to identify, select, and associate.

Now referring to FIG. 26 illustrating the group of methods 810 used by the invention to identify, select and associate methods intrinsic to the invention during operation of the invention wherein such methods may be obtained by means of a communication mediums utilizing electromagnetic waves, the internet, the World Wide Web, file transfer protocols and any other telecommunications mediums capable of transmitting the data describing the release mechanisms and its related information.

Figure 27:
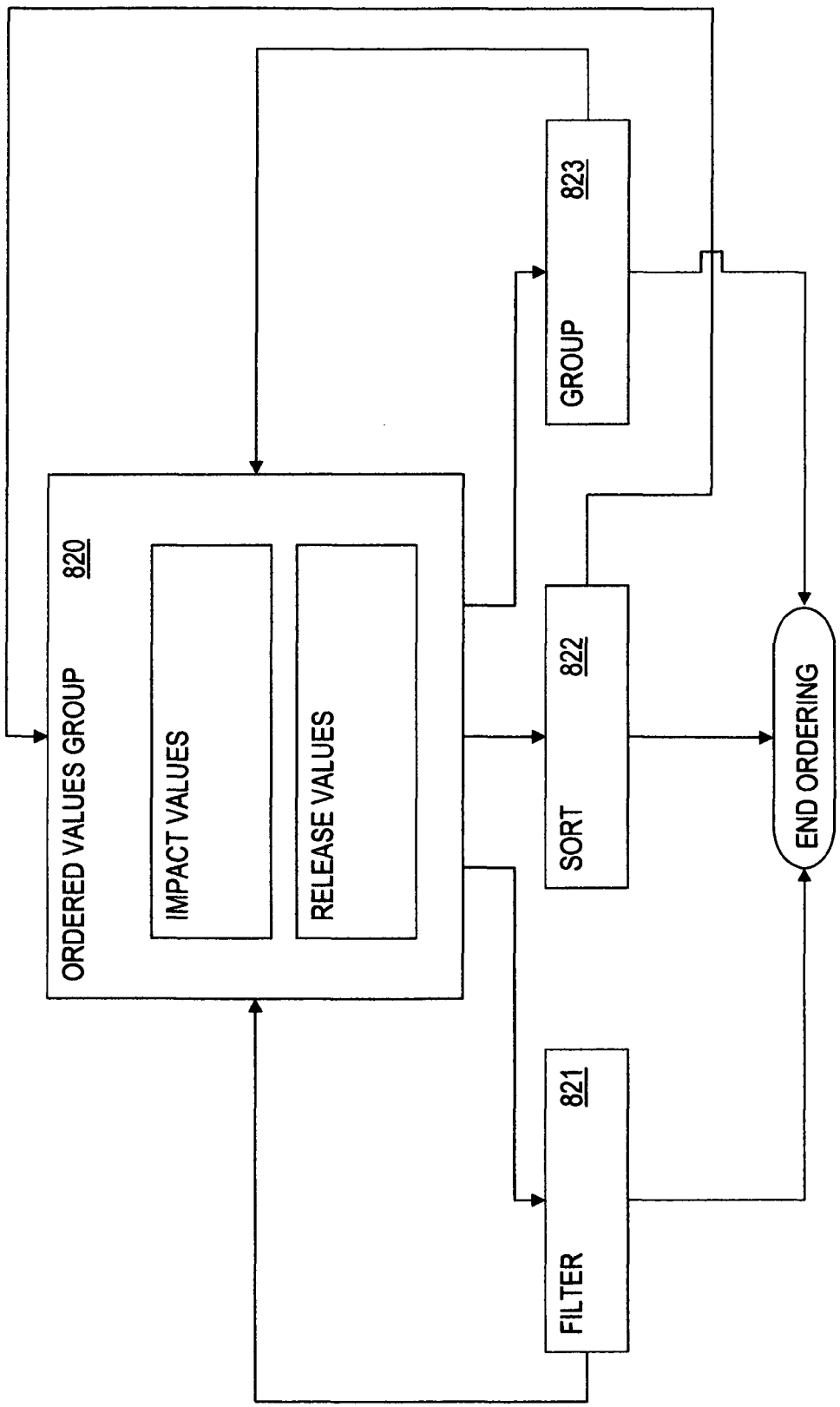
FIG. 27 illustrates the group of ordered values and the data ordering operations of the invention.

Now referring to FIG. 27, the operations used by the invention to order the values and results used and reported by the invention are illustrated wherein resultant groups of the processes may in turn be filtered by process 821, sorted by process 822, and grouped by process 823 wherein the resultant groups can be in turn further ordered by the same process.

Figure 28:
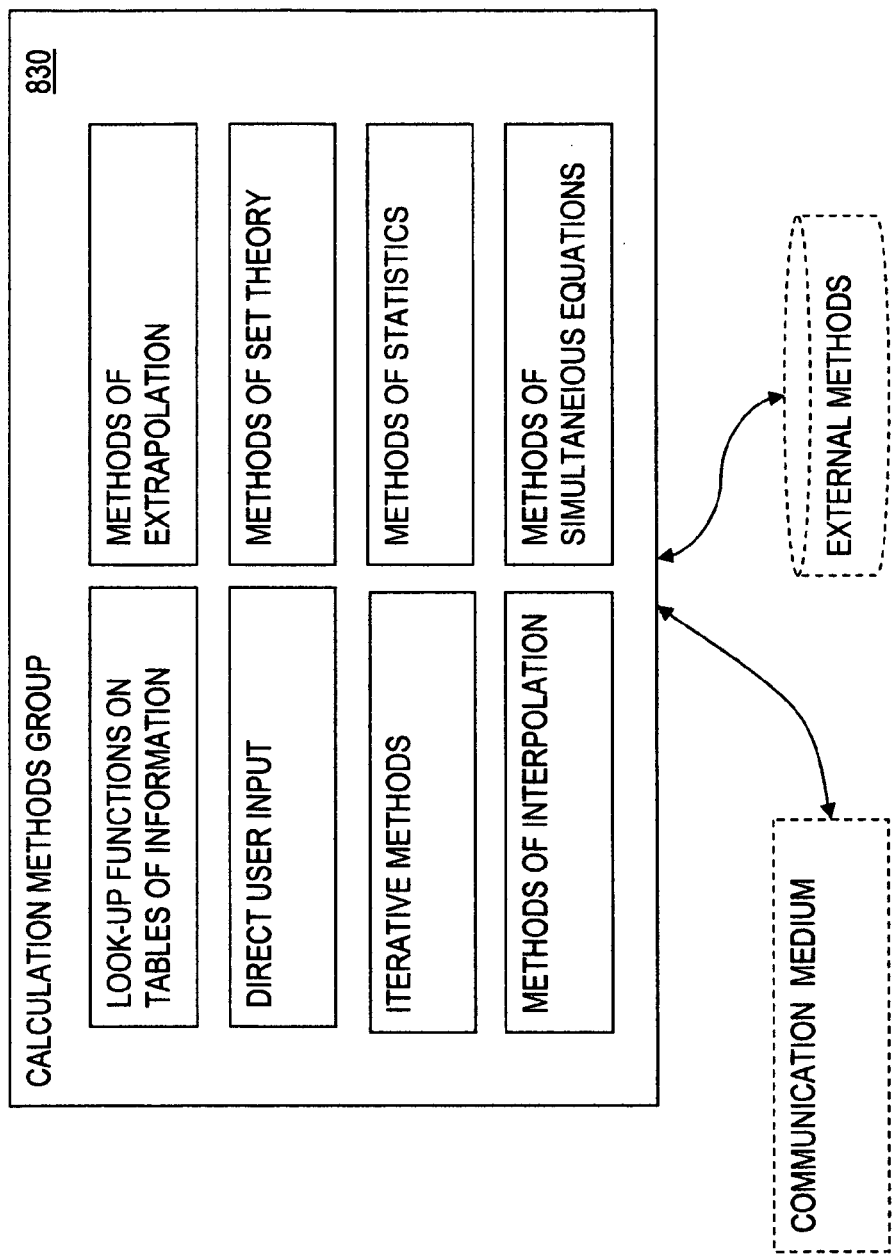
FIG. 28. shows the group of calculation methods used by the invention.

Now referring to FIG. 28, the group of calculation methods 830 used by the processes of the invention to perform calculations is illustrated wherein calculation methods may be obtained by means of a communication medium utilizing electromagnetic waves, the internet, the World Wide Web, file transfer protocols and telecommunications mediums capable of transmitting the data describing the release mechanisms and its related information.

Figure 29:
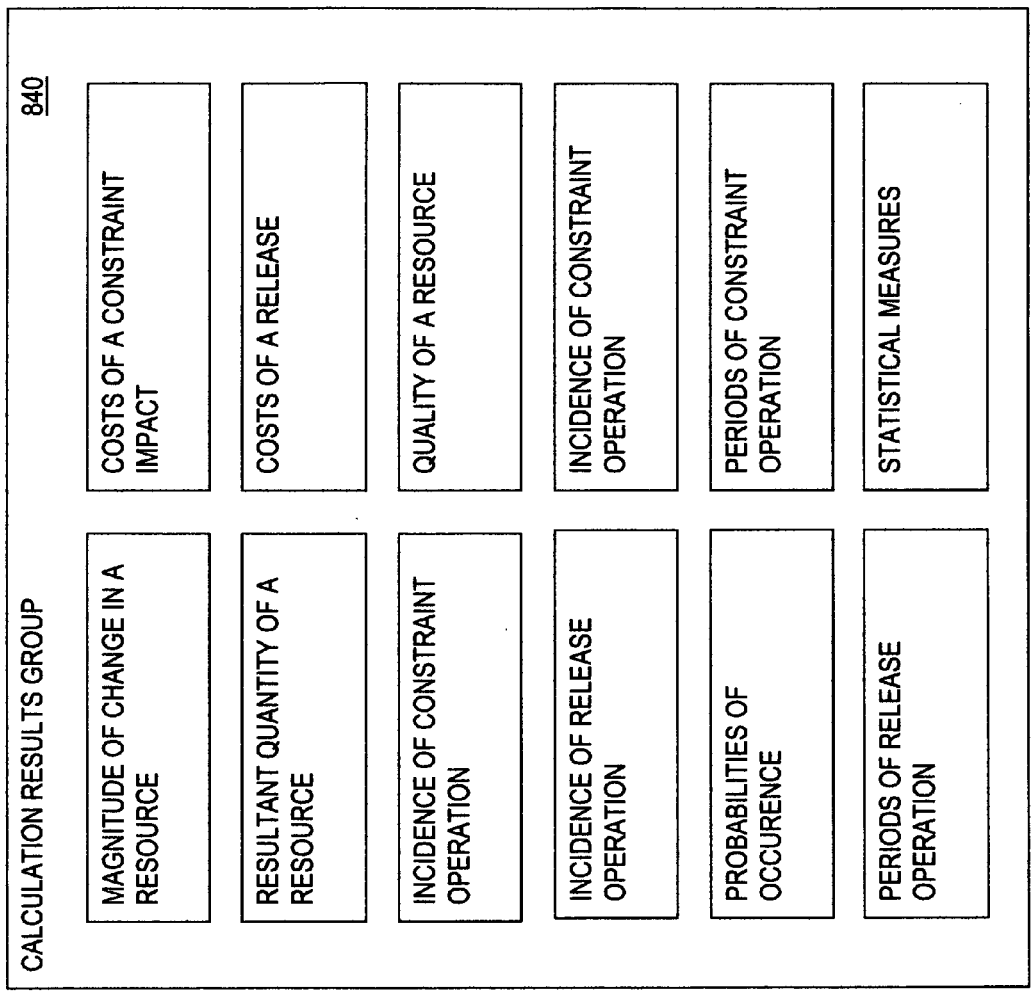
FIG. 29. shows the group of calculation results produced by the calculation methods during the operation of the invention.

Now referring to FIG. 29, the group of calculation results 840 the invention is operable to produce is illustrated.

Figure 30:
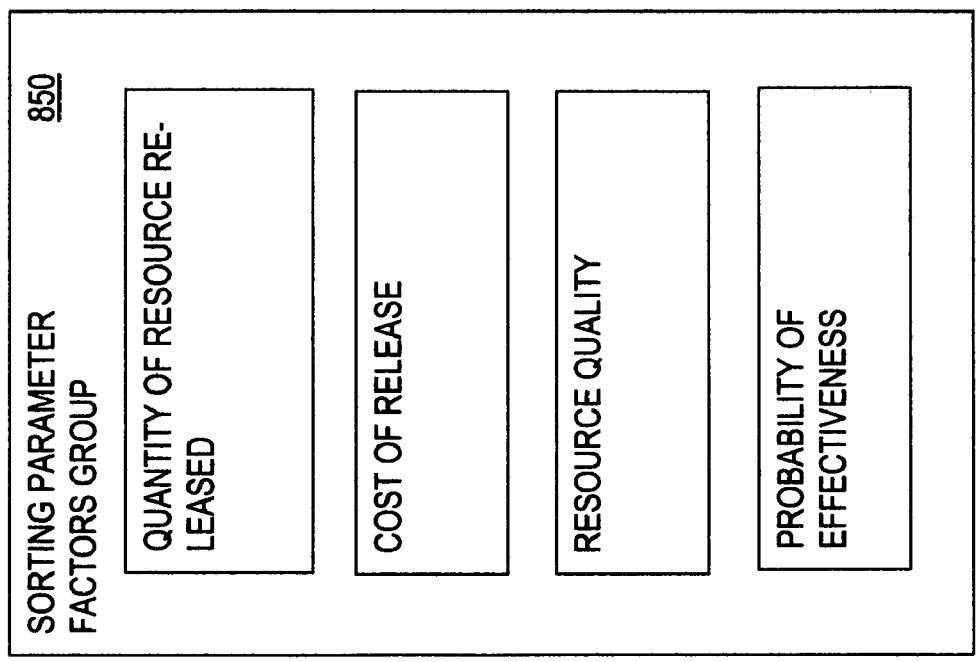
FIG. 30. shows the group of factors that can be used to calculate sort parameters.

Referring now to FIG. 30, the group of factors 850 used in generating sorting parameters is illustrated.

Figure 31:
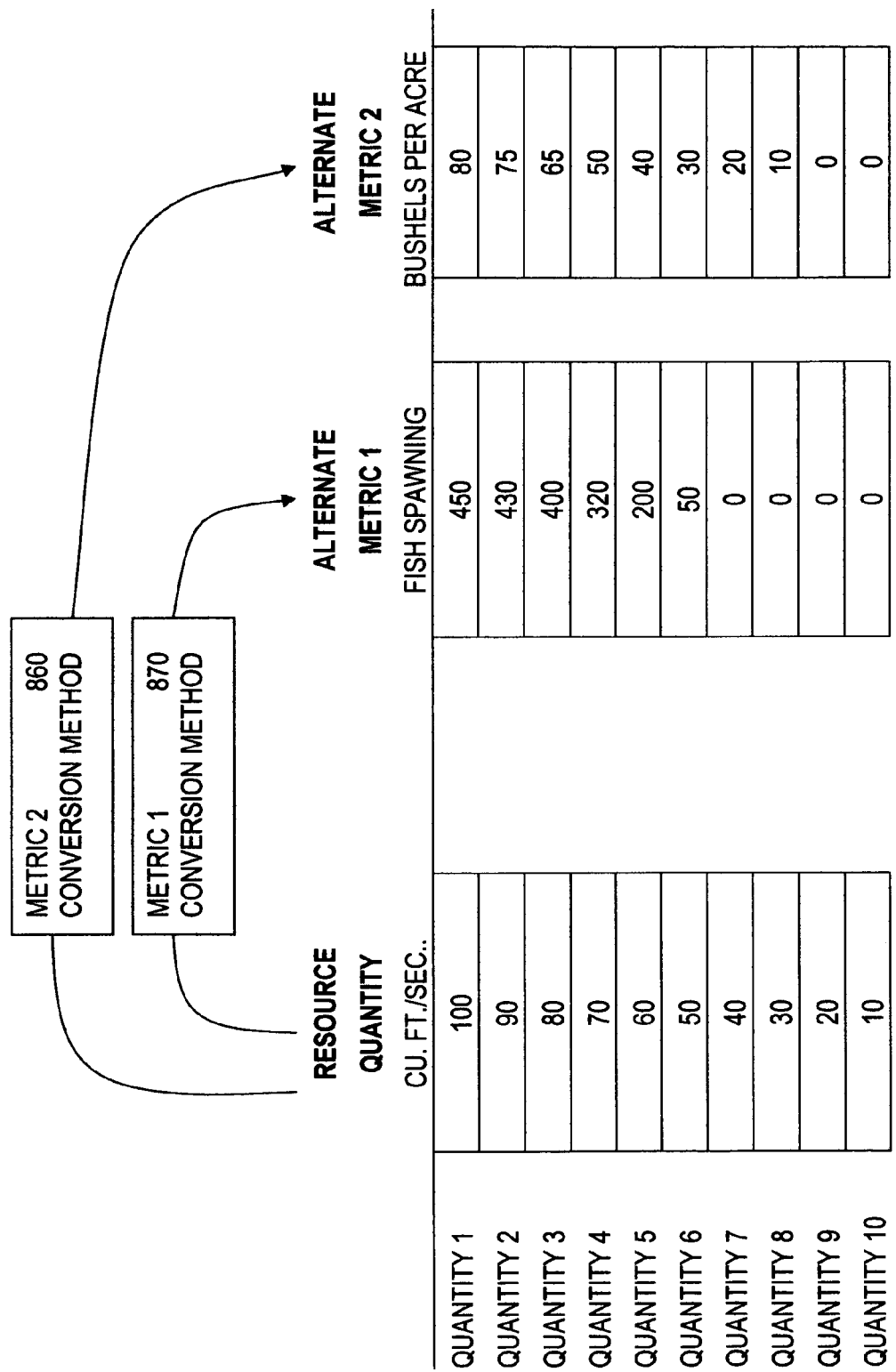
FIG. 31 illustrates the conversion of the main resource to alternate metrics.

Now referring to FIG. 31, an illustration of the operation of the method for recognizing and using the resource(s) under evaluation as a "common currency" for evaluating impacts on other parameters wherein impacts and quantities of the resource(s) being evaluated are translated into quantities, alternate metrics, and units of other physical, financial, or symbolic quantities, results, or resources using a method selected from the calculation methods group depicted in FIG. 28. The metric transformation method 860 illustrates the translation from one resource quantity to an alternate metric and wherein the metric transformation method 870 illustrates an additional alternate metric transformation. One skilled in the art would readily recognize that the techniques for evaluating impacts on other resources will be dependent upon the type and scope of constraint encountered and that there are many techniques for implementing the translation to alternate metrics which could be similarly implemented without departing from the scope of this invention.

Figure 32:
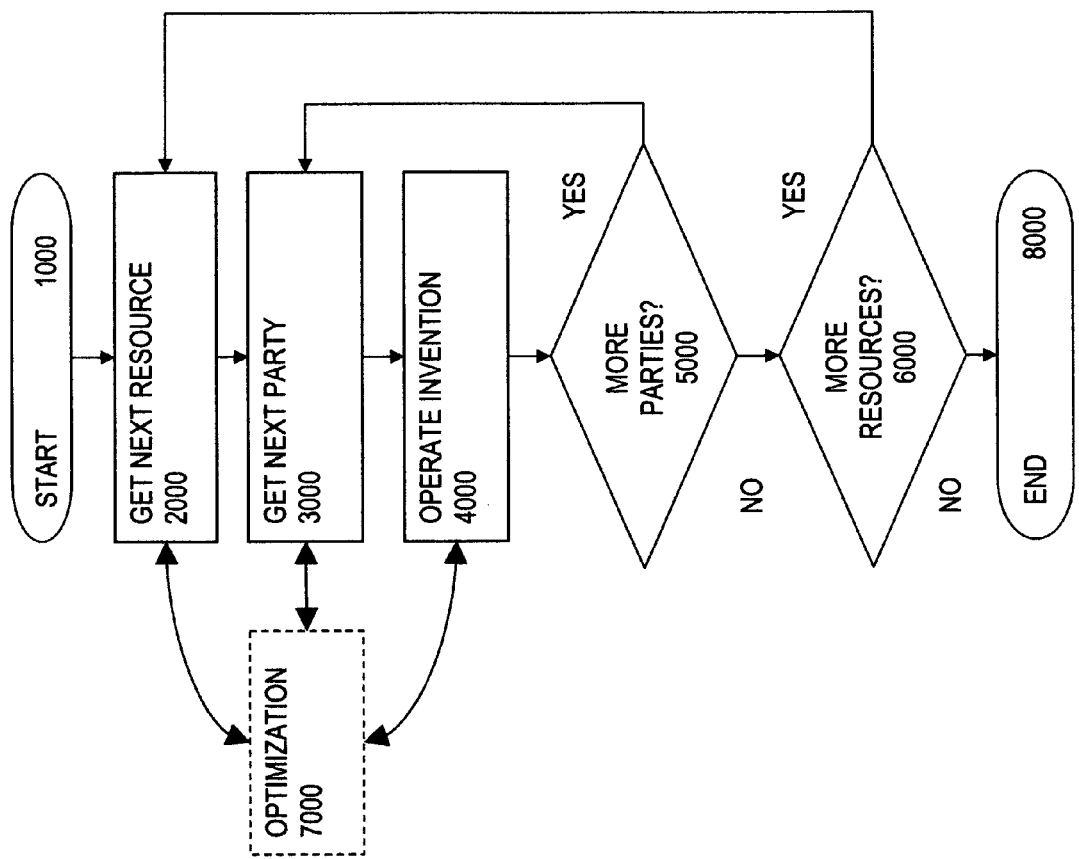
FIG. 32 shows a flow chart describing a method of repeated operation of the invention across multiple resources and multiple parties as a means to optimize deliveries and cooperative management.

Referring now to FIG. 32, the flow chart describes the method of repeated operation of the invention across multiple resources and multiple parties as a means to optimize deliveries and cooperative management. The process begins with the step 1000. The next resource under evaluation is obtained in process 2000. The next party for which the resource will be evaluated is obtained in process 3000. The invention is operated in process 4000 whereafter, if process 5000 determines there are remaining parties to evaluate, the next party is obtained and the process repeated starting with process 3000 until there are no more parties, whereafter if process 6000 determines there are remaining resources to evaluate, the whole process is repeated starting with process 2000 until there are no more resources to evaluate after which the evaluation terminates at step 8000. Throughout the evaluation, optional optimization process 7000 interacts with processes 2000, 3000, and 4000 to adjust values, parties, and resources as well as redirect the execution of steps to optimize the delivery and allocation of the resources across all parties. In particular, optional process 7000 may interact to access and update values on the common table of values 620 as depicted in FIG. 24 and elsewhere. One skilled in the art would readily recognize that there are many techniques for implementing process 7000 as well as its interaction with a common table of values which could be similarly implemented without departing from the scope of this invention.

Figure 33:
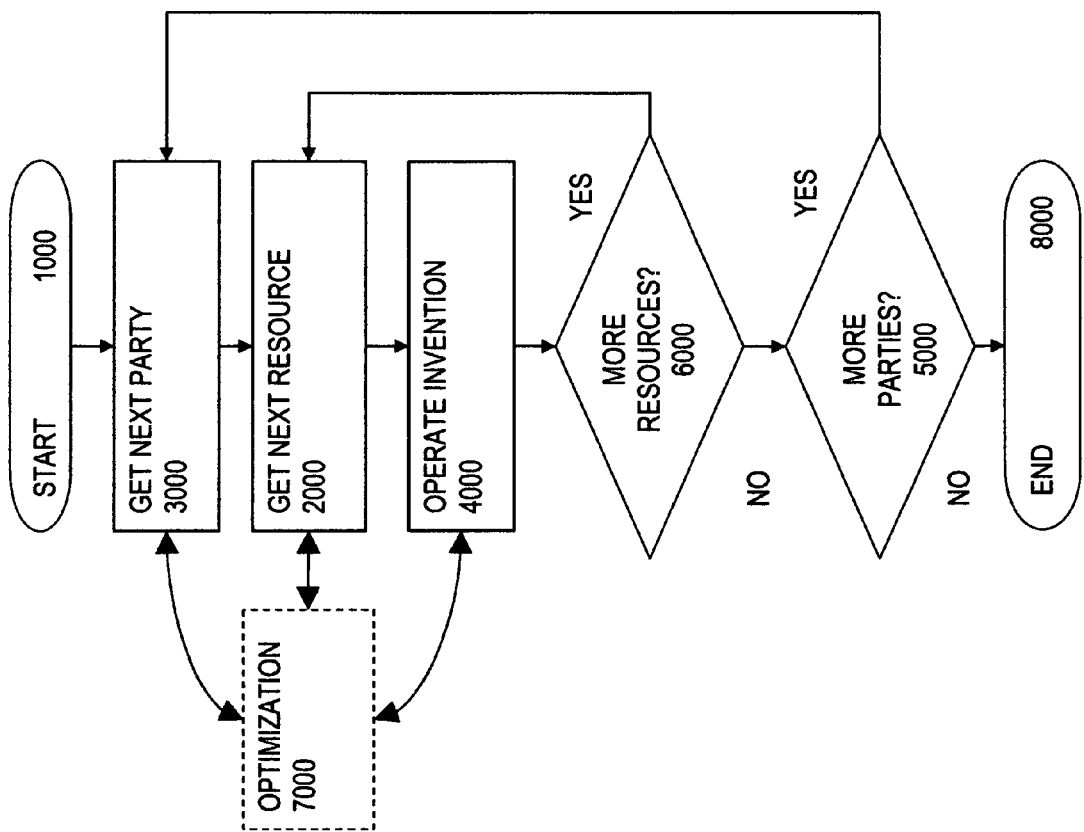
FIG. 33 shows a flow chart describing an alternate method of repeated operation of the invention across multiple resources and multiple parties as a means to optimize deliveries and cooperative management.

Now referring to FIG. 33, the flow chart identifies an identical representation of the flow chart illustrated in FIG. 32 except that the order of process 2000 and process 3000 and the order of process 5000 and process 6000 have been reversed to illustrate the operation of the invention wherein all resources are evaluated for each party before beginning evaluation of the next party. With the exception of this change, all other operations described for FIG. 3 are similarly applied to this figure.

Now referring again to FIG. 1, wherein the illustrated resource having a magnitude and displaceable through two points is a "negative resource" wherein the resource is defined as such and the methods previously described are applied are employed without modification except for constraints assigned must be operable to constrain the negative resource and releases assigned must be operable to release the negative resource. Alternatively, the methods previously described may be employed substituting releases for constraints and constraints for releases in the operation of the invention.

Figure 34:
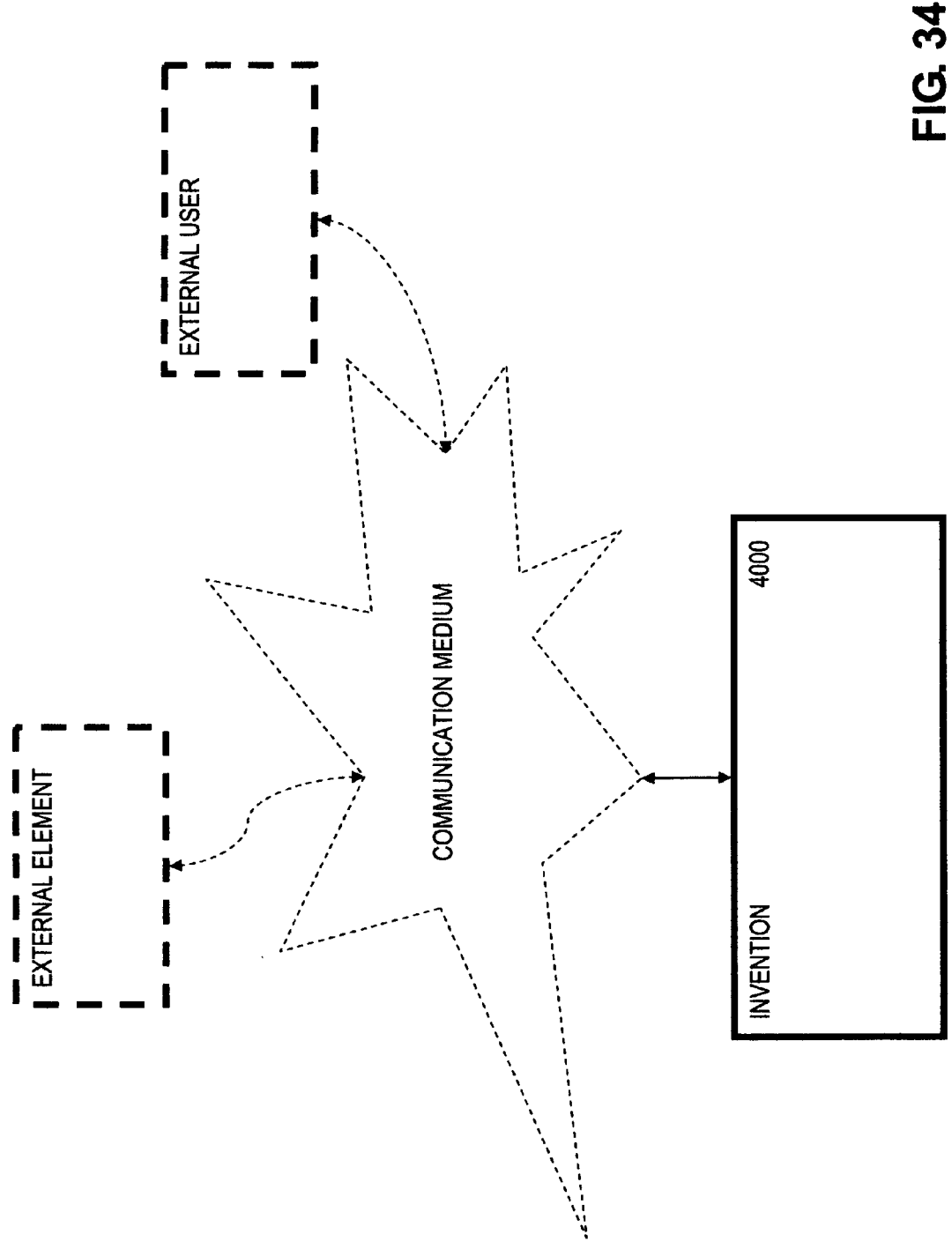
FIG. 34 illustrates the ability to use external elements, methods and components within the invention 4000 and the ability to interact with external users.

Now referring to FIG. 34, an illustration showing how the invention and elements of the invention may access and be externally accessed and utilized by means of a communication medium utilizing electromagnetic waves, the internet, the World Wide Web, file transfer protocols and telecommunications mediums capable of transmitting the data describing the elements of the invention 4000.

Figure 35:
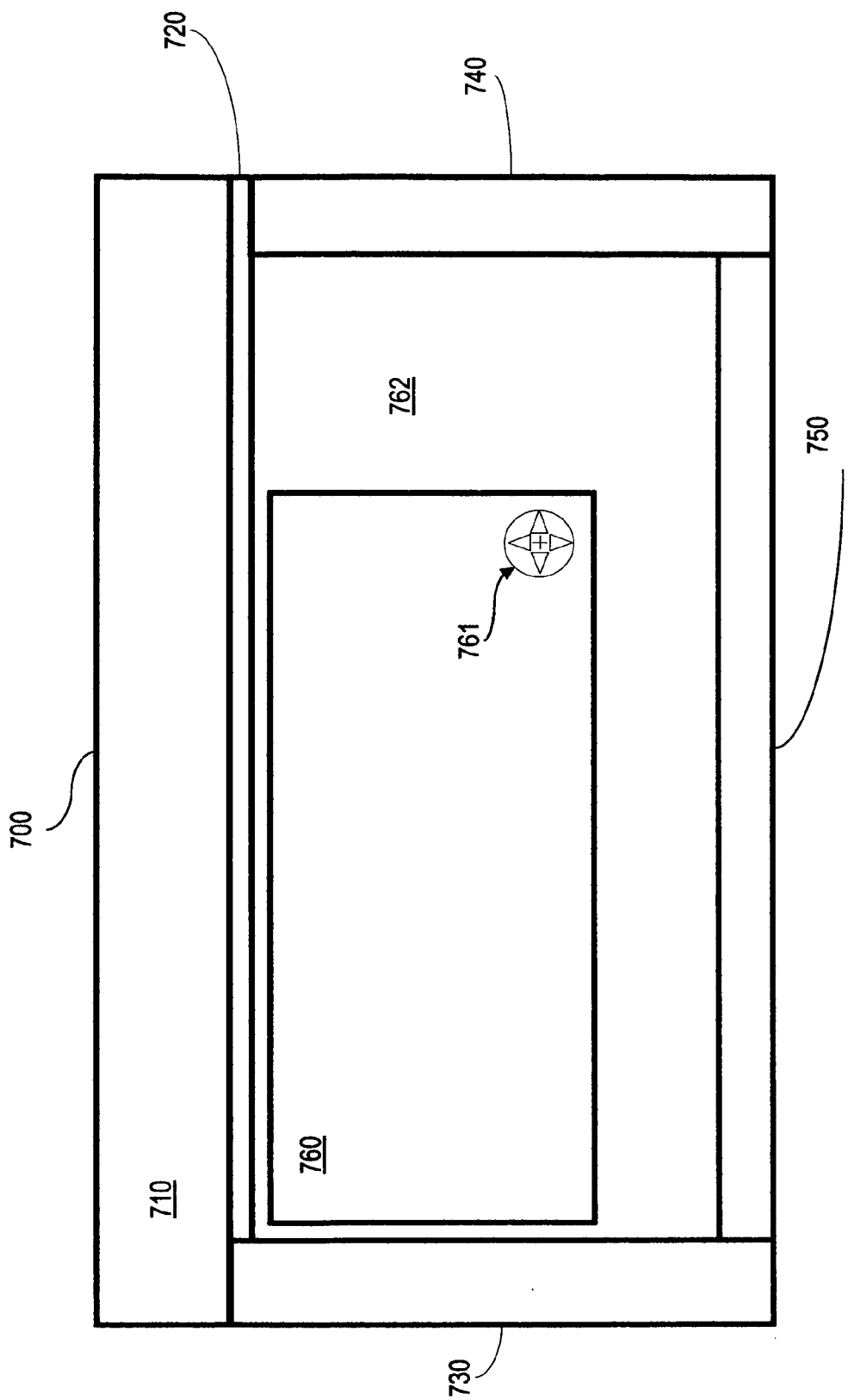
FIG. 35 shows a screen for displaying a delivery system in an embodiment of the graphical user interface.

Now referring to FIG. 35, a particular embodiment of interface 700 as relates to water resources wherein standard features available for implementation on all screens comprising the graphical user interface is shown. Standard elements include a dock-able and/or hide-able header bar and/or region displaying information and manipulation methods associated with any program structure within which the invention resides called out in the illustration as element 710; a dock-able and/or hide-able display region and/or bar for showing and creating multiple scenarios called out in the illustration as element 720; a dock-able and/or hide-able main function bar and/or region displaying information and methods associated with the main function and methods of the invention called out in the illustration as element 730 that provides a display of information and methods that are organized into one or more of the following functional categories and sub-categories selected from FIG. 36; a dock-able and/or hide-able network display region and/or bar wherein the elements and information associated within the invention are represented such that the corresponding features can be shown or hidden by toggling the associated element on the bar on or off and called out in the illustration as element 740; and a utility bar and/or region associated with miscellaneous and associated functions of the invention not incorporated into the other elements of the interface called out in the illustration as element 750.

Still referring to FIG. 35, a screen within a particular embodiment of interface 700 is illustrated showing a network display 760 presenting the lines, nodes and other features that make up the delivery system including. the features, constraints, impacts and releases associated with the network; a navigation control 761 that allows scrolling, panning and zooming the network display 760; and an analyses display region and/or pane 762 for displaying information and results associated with analyses performed in conjunction and/or as a part off the functions of the invention.

Figure 36:
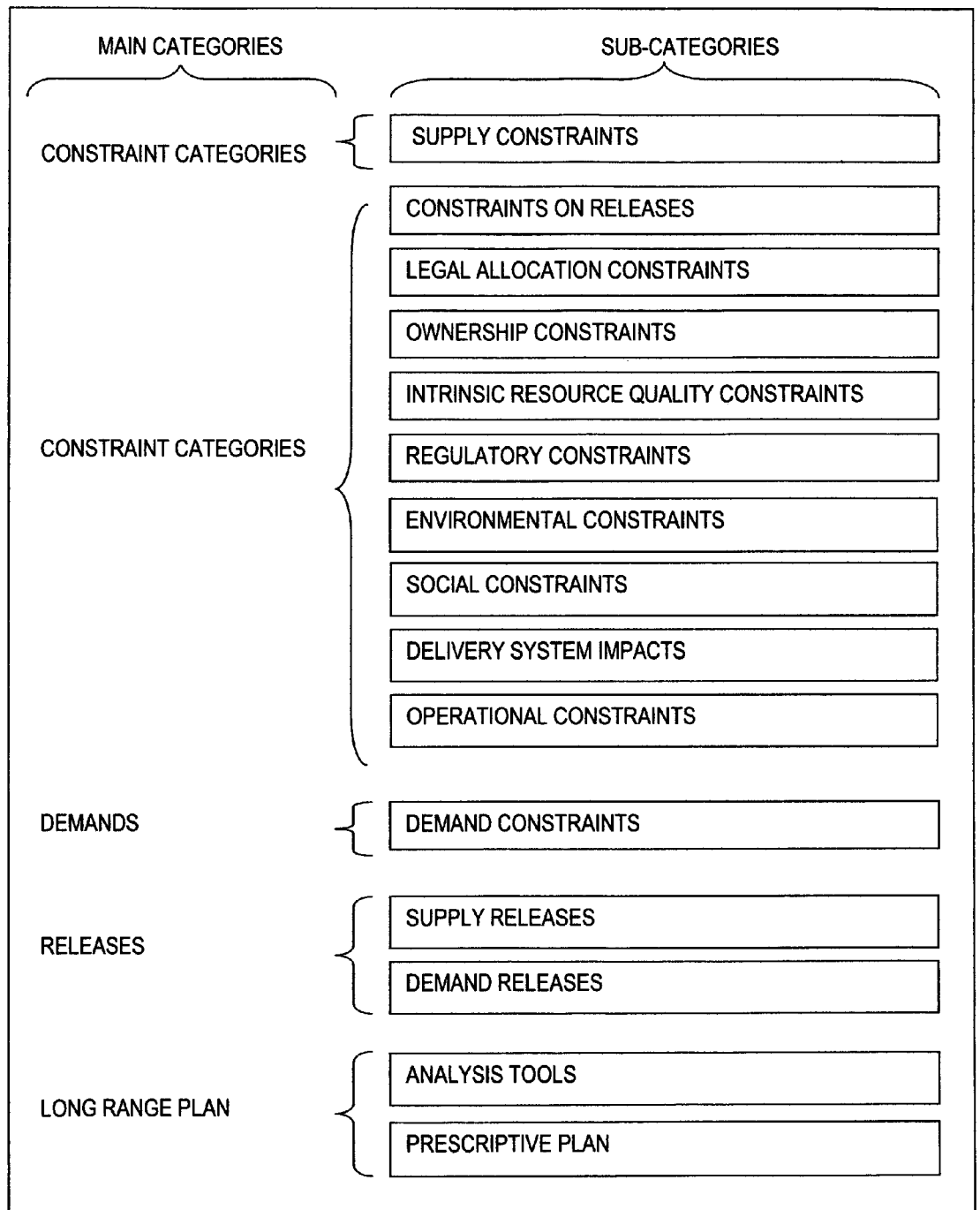
FIG. 36 illustrates the general organization of the inventions elements in one embodiment that would be appropriately applied to physical resources.

Now referring to FIG. 36 wherein a particular embodiment of the water resources embodiment of the interface provides for a specific organization of the elements 735 on the main function bar of the interface wherein the terms used are generally descriptive of the functions and the order described by the illustration is preferred but not necessary and wherein some categories may not be included depending upon the embodiment of the invention.

Now referring to FIG. 37, a screen 770 within a particular embodiment of the interface presenting the impacts of the constraints and organized by constraint category with impact detail presented for each constraint.

Now referring to FIG. 38, a screen 780 within a particular embodiment of the interface presenting the constraints, constraint impacts and the associated releases along with associated information and organized by category of constraint is illustrated.

Now referring to FIG. 39, a screen 790 within a particular embodiment of the interface as relates to water resources presenting an ordered sequence of steps, the selected releases for each constraint and other information associated with the action of the release upon the constraint and resource delivery is illustrated.

Figure 40:
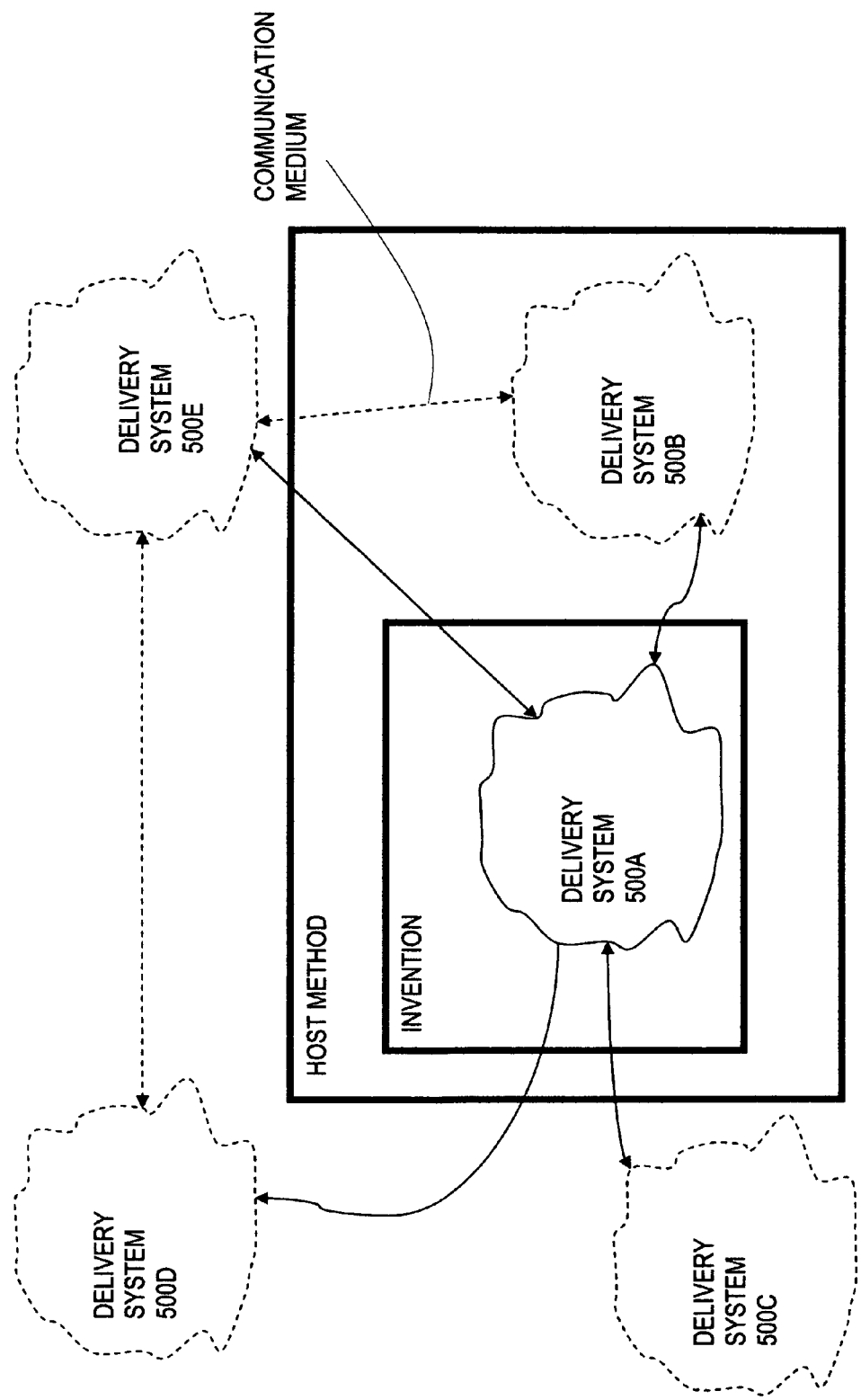
FIG. 40 shows a distributed form of a delivery system operable by the invention.

Now referring to FIG. 40, a symbolic representation of varying configurations of the delivery system upon which the invention is operable where delivery system 500A represents a delivery system forming a part of the invention in which the delivery system resides; delivery system 500B represents the a delivery system forming a part of an invention in which the invention resides; delivery system 500C represents a copy of a network representing the delivery system residing outside the invention; and delivery systems 500D and 500E represent one or more independent or interdependent networks resident in different physical or virtual locations wherein the plurality of networks represent the delivery system wherein said networks reside within or without the invention and wherein dispersed portions of the network model are dynamically connected or maintained and/or stored in continuity by means of a communication medium utilizing electromagnetic waves, the internet, the World Wide Web, file transfer protocols and telecommunication mediums capable of transmitting the data describing delivery system elements and its related information.

Now referring to FIG. 41, a decision-making apparatus 9000 operable to operate the invention comprising a computer system with a processor 9100 for interpreting instructions 9300 programmed in computer readable code and stored in memory 9200, the means for executing the invention, wherein the apparatus includes a user interface 9400, and network interface 9500 for interaction with network participants 9600 and in instances where said apparatus is dynamically controlling a physical delivery system, a delivery network control system 9700 and a set of system controls 9800 operable by the apparatus.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A computer implemented method for releasing constraints limiting the supply of a resource to meet a demand by applying releases to modify the amount by which constraints decrease supply or create a demand comprising:
   identifying a limited resource, wherein the limited resource is capable of being displaced from a point to another point within a delivery system;
   identifying a representation of the delivery system having a plurality of paths where each path is positioned between at least two of a plurality of points;
   applying a plurality of constraints to elements of the representation of the delivery system by:
      identifying a plurality of supply and demand constraints associated with the identified limited resource; and
      selecting one of the plurality of supply or demand constraints;
   identifying a plurality of impact calculation methods for generating a set of impact values wherein the set of impact values indicates at least a change in a magnitude of the limited resource over a period of time in response to the selected supply or demand constraint and wherein one of the impact values indicates a quantitative measure to the selected supply or demand constraint;
   selecting at least one of the plurality of impact calculation methods to calculate the set of impact values wherein the selected impact calculation methods are associated with one of the supply or demand constraints;
   associating one of the plurality of supply or demand constraints to at least one element of the representation of the delivery system; and calculating by the processor, an impact value based on the selected at least one of the plurality of impact calculation methods for the selected one of the plurality of supply or demand constraints;

identifying a plurality of release methods to either:

modify an amount by which supply and demand constraints decrease supply or create a demand; or release the bounds of a plurality of supply constraints; or increase the bounds of a plurality of demand constraints;

selecting at least one of the plurality of release methods as a candidate for releasing the selected one of the plurality of supply or demand constraints;

identifying a plurality of release calculation methods for calculating a set of release values for each of the selected release methods, wherein the set of release values indicates at least a change in a release amount of the limited resource over a period of time that the selected release method is operable to effect;

selecting and applying at least one of the plurality of release calculation methods to calculate a set of release values for each of the selected release methods;

associating each selected release method to the at least one element of the representation of the delivery system;

calculating by the computer processor, a set of release values for each selected release method using the selected release calculation method;

identify a plurality of sort parameters calculated from at least one of the plurality of release values specific to the selected release method;

assigning a sorting parameter to each of the selected release methods, wherein the sorting parameter is calculated from at least one of the plurality of release values specific to each selected release method;

applying at least one sorting parameter calculation method from a set of sorting parameter calculation methods to generate a sort value for each selected release method;

calculating by the computer processor, a sort value for each selected release method;

sorting the release methods in an order selected from the group consisting of an increasing order or a decreasing order based on the sort value;

generating by the computer processor, a subset of at least one selected release method by identifying said at least one release method having a sort value exceeding a threshold sort value; and implementing the subset of at least one selected release method.

2. A method according to claim 1, wherein one of the plurality of constraints is selected from the group of a supply constraint operable to bound the supply of a resource by bounding the use of at least one release method and a demand constraint operable to bound the demand for the resource by bounding the use of at least one release method.

3. A method according to claim 1 wherein the invention is operable over a plurality of time steps.

4. A method according to claim 1 wherein the invention is recursively applied wherein operation of processes in earlier recursions operable without modification in subsequent recursions are not repeated in subsequent recursions of the method.

5. A method according to claim 3 wherein calculated values of calculation methods are compiled over multiple time steps.

6. A method according to claim 1 further comprising:

recording the plurality of impact and release values on one table;

associating the plurality of releases values with the plurality of impact values on one table; and associating sort parameter values with the plurality of release values on one table wherein tables used for recording and associating values are accessible by methods selected from the group consisting of methods utilized as part of the invention and methods not utilized as a part of the invention.

7. A method according to claim 1 wherein the selection of constraint and release calculation methods includes:

monitoring the values and operation of one representation of a delivery system operable to calculate one delivery system property;

modifying the values and the operation of one representation of a delivery system operable to calculate one delivery system property; and operating a method operable to calculate one delivery system property and at least one limited resource property.

8. A method according to claim 1 wherein identification, selection, and association of constraint methods, constraint calculation methods, release methods, release calculation methods, sort parameters, sort parameter calculation methods, and the values thereof as therein described is accomplished by at least one method selected from the group consisting of input by the user and embodiment-specific presets.

9. A method according to claim 1 comprised of one operation selected from the following group consisting of filtering, grouping, and sorting wherein the operation is applied to one of the group consisting of impact values and release values.

10. A method according to claim 1 wherein methods for calculating constraint impacts, release values, and sort parameters are comprised of one calculation method selected from the group including:

direct user input; iterative methods; methods of interpolation; methods of extrapolation; methods of set theory methods of statistics; and methods of simultaneous solutions.

11. A method according to claim 10 wherein one value is calculated and is selected from the group including:

a magnitude of change in a resource; a resultant quantity of a resource; costs of a constraint impact costs of a release; quality of a resource; a incidence of constraint operation; a incidence of release operation; probabilities of occurrence; periods of constraint operation; periods of release operation; and statistical measures.

12. A method according to claim 1 wherein the sorting parameter is selected from a mathematical or algorithmic derivation of factors selected from the group including:

a quantity of resource released; a cost of the release; resource quality; probability of effectiveness.

13. A method according to claim 1 wherein such methods are operable to be applied in a reverse order so as to obstruct or prohibit delivery of a resource selected from the group consisting of exercising the invention against a "negative resource" wherein the resource delivered is the absence of the resource and substituting releases for constraints and constraints for releases in the operation of the invention.

14. A method according to claim 1 further comprising:

recognizing and using one resource under evaluation as a "common currency" for evaluating impacts on other parameters wherein at least one selected from the group consisting of resource quantities, financial quantities, and symbolic quantities of the resource being evaluated is translated into at least one selected from the group consisting of resource quantities, financial quantities, and symbolic quantities for a plurality of resources using at least one method selected from the group including:

direct user input; look-up functions on tables of information; iterative methods; methods of optimization; methods of interpolation; methods of extrapolation; methods of set theory; methods of statistics; methods of simultaneous solutions.

15. A method according to claim 1 further comprising:
repeating operation of the method for releasing constraints across multiple parties and multiple resources wherein optional optimization methods are employed as a means to optimize deliveries and cooperative resource management.

* * * * *